(12) United States Patent
Gao et al.

(10) Patent No.: US 12,079,537 B2
(45) Date of Patent: Sep. 3, 2024

(54) SCREEN PROJECTION METHOD AND SYSTEM, AND RELATED APPARATUS

(71) Applicant: HUAWEI TECHNOLOGIES CO., LTD., Guangdong (CN)

(72) Inventors: Kang Gao, Wuhan (CN); Qianqiao Hu, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/552,630

(22) PCT Filed: Mar. 25, 2022

(86) PCT No.: PCT/CN2022/083046
§ 371 (c)(1),
(2) Date: Sep. 26, 2023

(87) PCT Pub. No.: WO2022/206600
PCT Pub. Date: Oct. 6, 2022

(65) Prior Publication Data
US 2024/0184504 A1    Jun. 6, 2024

(30) Foreign Application Priority Data

Mar. 31, 2021  (CN) .......................... 202110350868.4

(51) Int. Cl.
*G06F 3/14* (2006.01)
(52) U.S. Cl.
CPC .................................. *G06F 3/1454* (2013.01)
(58) Field of Classification Search
CPC .... G06F 3/1454; G06F 3/1446; G06F 3/0481; G06F 3/0486; G06F 3/04886; G06F 3/147; G06F 16/71; G06F 2203/04803; G06F 40/106; G09G 2354/00; G09G 2340/0407; G09G 2340/10; G09G 2340/14;
(Continued)

(56) References Cited

U.S. PATENT DOCUMENTS

2010/0001995 A1   1/2010   Hamill et al.
2013/0278484 A1   10/2013  Hwang et al.
(Continued)

OTHER PUBLICATIONS

Extended European Search Report in European Appln No. 22778782.7, dated Jul. 9, 2024, 12 pages.

*Primary Examiner* — Dong Hui Liang
(74) *Attorney, Agent, or Firm* — Fish & Richardson P.C.

(57) ABSTRACT

This application discloses screen projection methods and systems and related apparatuses. In an example method, a first electronic device may send first display data corresponding to a first screen projection window on a second electronic device and second display data corresponding to a second screen projection window on the second electronic device to the second electronic device. The first electronic device may further send third display data and fourth display data to the second electronic device. In response to determining that the third display data is different from the first display data and that the fourth display data is the same as the second display data, the second electronic device may render and display a third screen projection page in the first screen projection window based on the third display data and display a buffered second screen projection page in the second screen projection window.

20 Claims, 20 Drawing Sheets

(58) Field of Classification Search
CPC ......... G09G 2330/021; G09G 2350/00; G09G 2360/12; G09G 2360/04; G09G 2370/20; G09G 2370/16; G09G 5/006
See application file for complete search history.

(56) References Cited

U.S. PATENT DOCUMENTS

| | | | |
|---|---|---|---|
| 2017/0316541 A1* | 11/2017 | Kim | G09G 5/363 |
| 2019/0087144 A1* | 3/2019 | Yadav | G06F 3/147 |
| 2019/0089927 A1* | 3/2019 | Yadav | G06T 1/60 |
| 2020/0293104 A1* | 9/2020 | Kim | G06F 1/3206 |

* cited by examiner

SCREEN PROJECTION METHOD AND SYSTEM, AND RELATED APPARATUS

CROSS-REFERENCE TO RELATED APPLICATIONS

This application is a national stage of International Application No. PCT/CN2022/083046, filed on Mar. 25, 2022, which claims priority to Chinese Patent Application No. 202110350868.4, filed on Mar. 31, 2021. Both of the aforementioned applications are hereby incorporated by reference in their entireties.

TECHNICAL FIELD

This application relates to the field of terminal technologies, and in particular, to a screen projection method and system, and a related apparatus.

BACKGROUND

With the development of digital technologies, computerizing an electronic device such as a mobile phone to be a personal computer (personal computer, PC) has become one of the important means for implementing mobile office. In particular, after establishing a connection to a PC device, the mobile phone may project a plurality of interfaces on the mobile phone to the PC device in real time for display. In addition, files such as pictures and videos can be seamlessly shared between the mobile phone and the PC device. A user can also use a mouse and a keyboard to perform an operation on the PC device, to quickly process messages and files on the mobile phone.

When the mobile phone projects an interface of an application to the PC device, the mobile phone may maintain a resolution of the mobile phone and encode and transmit image data. After the PC device receives the image data, the PC device may split to display a plurality of windows. Because images of the plurality of windows are rendered at a same frame rate, it is inevitable that a graphics processing unit (graphics processing unit, GPU) is under heavy load. As a result, it leads to delayed display and suspended operation on the PC device.

SUMMARY

This application provides a screen projection method and system, and a related apparatus. When an electronic device projects a screen to a large-screen device, if a screen projection surface does not change compared with a surface of a previous frame, the large-screen device may continue to use the rendered screen projection surface of the previous frame. Therefore, workload of a GPU of the large-screen device is reduced, and screen projection performance is improved.

According to a first aspect, this application provides a screen projection system. The screen projection system includes a first electronic device and a second electronic device. The first electronic device is configured to obtain first display data corresponding to a first screen projection window on the second electronic device and second display data corresponding to a second screen projection window on the second electronic device. The first electronic device is further configured to send the first display data and the second display data to the second electronic device. The second electronic device is further configured to render and display a first screen projection page in the first screen projection window based on the first display data, and render and display a second screen projection page in the second screen projection window based on the second display data. The first electronic device is further configured to obtain third display data corresponding to the first screen projection window on the second electronic device and fourth display data corresponding to the second screen projection window on the second electronic device. The first electronic device is further configured to send the third display data and the fourth display data to the second electronic device. The second electronic device is further configured to: when determining that the third display data is different from the first display data and the fourth display data is the same as the second display data, render and display a third screen projection page in the first screen projection window based on the third display data, and display the buffered second screen projection page in the second screen projection window.

This application provides a screen projection method. A first electronic device may send screen projection data to a second electronic device. If a first screen projection window in the screen projection data changes relative to screen projection data of a previous frame, and a second screen projection window in the screen projection data does not change relative to the screen projection data of the previous frame, the second electronic device may render a new screen projection page in the first screen projection window, and continue to use, in the second screen projection window, a screen projection page that has been rendered in the previous frame. In this way, workload of a GPU of the second electronic device is reduced, and screen projection performance is improved.

In a possible implementation, the sending the first display data and the second display data to the second electronic device specifically includes: drawing the first display data and the second display data in a first screen projection image frame, and recording a region range of the first display data in the first screen projection image frame and a region range of the second display data in the first screen projection image frame; and sending the first screen projection image frame, the region range of the first display data in the first screen projection image frame, and the region range of the second display data in the first screen projection image frame to the second electronic device. The second electronic device is further configured to: before rendering and displaying the first screen projection page in the first screen projection window based on the first display data, and rendering and displaying the second screen projection page in the second screen projection window based on the second display data, crop out the first display data from the first screen projection image frame based on the region range of the first display data in the first screen projection image frame, and crop out the second display data from the first screen projection image frame based on the region range of the second display data in the first screen projection image frame.

In this way, the display data of the first screen projection window and the display data of the second screen projection window may be synthesized into a surface of a frame for sending, to avoid a latency of the screen projection surface caused because the display data of the first screen projection window and the display data of the second screen projection window do not arrive at the same time.

In a possible implementation, the sending the third display data and the fourth display data to the second electronic device specifically includes: drawing the third display data and the fourth display data in a second screen projection image frame, and recording a region range of the third display data in the second screen projection image frame and a region range of the fourth display data in the second screen projection image frame; and sending the second screen projection image frame, the region range of the third display data in the second screen projection image frame, and the region range of the fourth display data in the second screen projection image frame to the second electronic device. The second electronic device is further configured to: before rendering and displaying the third screen projection page in the first screen projection window based on the third display data, and displaying the buffered second screen projection page in the second screen projection window, crop out the third display data from the second screen projection image frame based on the region range of the third display data in the second screen projection image frame.

In this way, the display data of the first screen projection window and the display data of the second screen projection window may be synthesized into a surface of a frame for sending, to avoid a latency of the screen projection surface caused because the display data of the first screen projection window and the display data of the second screen projection window do not arrive at the same time.

In a possible implementation, the first electronic device is further configured to: determine a dirty region range in which image content in the second screen projection image frame is different from that in the first screen projection image frame: and send the dirty region range to the second electronic device. The determining that the third display data is different from the first display data and the fourth display data is the same as the second display data specifically includes: determining, when the dirty region range overlaps the region range of the third display data in the second screen projection image frame but does not overlap the region range of the fourth display data in the second screen projection image frame, that the third display data is different from the first display data and the fourth display data is the same as the second display data.

In this way, the first electronic device may mark a change range of the screen projection image frame, and send a dirty region range to the second electronic device. After the second electronic device receives the screen projection image frame, the second electronic device splits an interface in the dirty region range, and renders and displays the interface. For an image that is not in the dirty region range, the second electronic device continues to use a rendered image of a previous frame, avoiding a case in which a surface of a same frame is repeatedly rendered. Therefore, workload of a GPU of the second electronic device is reduced, and screen projection performance is improved.

In a possible implementation, the second electronic device is further configured to: when determining that the third display data is different from the first display data and the fourth display data is different from the second display data, render and display the third screen projection page in the first screen projection window based on the third display data, and render and display a fourth screen projection page in the second screen projection window based on the fourth display data.

In this way, when the surfaces in both the first screen projection window and the second screen projection window are updated, the second electronic device may re-render the surfaces in both the first screen projection window and the second screen projection window through the GPU.

In a possible implementation, the second electronic device is further configured to: when determining that the third display data is the same as the first display data and the fourth display data is the same as the second display data, display the buffered first screen projection page in the first screen projection window, and display the buffered second screen projection page in the second screen projection window:

In this way, when neither the surface in the first screen projection window nor the surface in the second screen projection window is updated, the second electronic device may display the rendered surface of the previous frame in both the first screen projection window and the second screen projection window.

In a possible implementation, the first electronic device is further configured to establish a wireless fidelity Wi-Fi direct connection to the second electronic device before obtaining the first display data corresponding to the first screen projection window on the second electronic device and the second display data corresponding to the second screen projection window on the second electronic device. The first electronic device is specifically configured to send the first display data and the second display data to the second electronic device through the Wi-Fi direct connection. The first electronic device is specifically configured to send the third display data and the fourth display data to the second electronic device through the Wi-Fi direct connection.

According to a second aspect, this application provides a screen projection method, applied to a second electronic device. The method includes: The second electronic device receives first display data corresponding to a first screen projection window and second display data corresponding to a second screen projection window that are sent by a first electronic device. The second electronic device renders and displays a first screen projection page in the first screen projection window based on the first display data, and renders and displays a second screen projection page in the second screen projection window based on the second display data. The second electronic device receives third display data corresponding to the first screen projection window and fourth display data corresponding to the second screen projection window that are sent by the first electronic device. When the second electronic device determines that the third display data is different from the first display data and the fourth display data is the same as the second display data, the second electronic device renders and displays a third screen projection page in the first screen projection window based on the third display data, and displays the buffered second screen projection page in the second screen projection window.

In a possible implementation, that the second electronic device receives first display data corresponding to a first screen projection window and second display data corresponding to a second screen projection window that are sent by a first electronic device specifically includes: The second electronic device receives a first screen projection image frame, a region range of the first display data in the first screen projection image frame, and a region range of the second display data in the first screen projection image frame that are sent by the first electronic device. The first screen projection image frame includes the first display data and the second display data. The second electronic device crops out the first display data from the first screen projection image frame based on the region range of the first display data in the first screen projection image frame, and crops out the second display data from the first screen projection image frame based on the region range of the second display data in the first screen projection image frame.

In a possible implementation, that the second electronic device receives third display data and fourth display data that are sent by the first electronic device specifically includes: The second electronic device receives a second screen projection image frame, a region range of the third display data in the second screen projection image frame, and a region range of the fourth display data in the second screen projection image frame that are sent by the first electronic device. The second screen projection image frame includes the third display data and the fourth display data. The second electronic device crops out the third display data from the second screen projection image frame based on the region range of the third display data in the second screen projection image frame, and crops out the fourth display data from the second screen projection image frame based on the region range of the fourth display data in the second screen projection image frame.

In a possible implementation, the method further includes: The second electronic device receives a dirty region range that is sent by the first electronic device and in which image content in the second screen projection image frame is different from that in the first screen projection image frame. That the second electronic device determines that the third display data is different from the first display data and the fourth display data is the same as the second display data specifically includes: When the dirty region range overlaps the region range of the third display data in the second screen projection image frame but does not overlap the region range of the fourth display data in the second screen projection image frame, the second electronic device determines that the third display data is different from the first display data and the fourth display data is the same as the second display data.

In a possible implementation, the method further includes.

When the second electronic device determines that the third display data is different from the first display data and the fourth display data is different from the second display data, the second electronic device renders and displays the third screen projection page in the first screen projection window based on the third display data, and renders and displays a fourth screen projection page in the second screen projection window based on the fourth display data.

In a possible implementation, the method further includes: When the second electronic device determines that the third display data is the same as the first display data and the fourth display data is the same as the second display data, the second electronic device displays the buffered first screen projection page in the first screen projection window, and displays the buffered second screen projection page in the second screen projection window.

In a possible implementation, before the second electronic device receives first display data corresponding to a first screen projection window and second display data corresponding to a second screen projection window that are sent by a first electronic device, the method further includes: The second electronic device establishes a wireless fidelity Wi-Fi direct connection to the first electronic device. That the second electronic device receives first display data corresponding to a first screen projection window and second display data corresponding to a second screen projection window that are sent by a first electronic device specifically includes: The second electronic device receives, through the Wi-Fi direct connection, the first display data and the second display data that are sent by the first electronic device. That the second electronic device receives third display data corresponding to the first screen projection window and fourth display data corresponding to the second screen projection window that are sent by the first electronic device specifically includes: The second electronic device receives, through the Wi-Fi direct connection, the third display data and the fourth display data that are sent by the first electronic device.

According to a third aspect, this application provides an electronic device, being a second electronic device. The second electronic device includes one or more processors, a Wi-Fi module, and one or more memories. The one or more memories and the Wi-Fi module are coupled to the one or more processors. The one or more memories are configured to store computer program code. The computer program code includes computer instructions. When the one or more processors execute the computer instructions, a communication apparatus is enabled to perform the screen projection method in any possible implementation of any one of the foregoing aspects.

According to a fourth aspect, an embodiment of this application provides a computer storage medium, including computer instructions, where when the computer instructions are run on a second electronic device, a communication apparatus is enabled to perform the screen projection method in any possible implementation of any one of the foregoing aspects.

According to a fifth aspect, an embodiment of this application provides a computer program product, where when the computer program product is run on a second electronic device, the second electronic device is enabled to perform the screen projection method in any possible implementation of any one of the foregoing aspects.

For beneficial effects of the second aspect to the fifth aspect, refer to the beneficial effects of the first aspect. Details are not described again.

DESCRIPTION OF EMBODIMENTS

Figure 1:
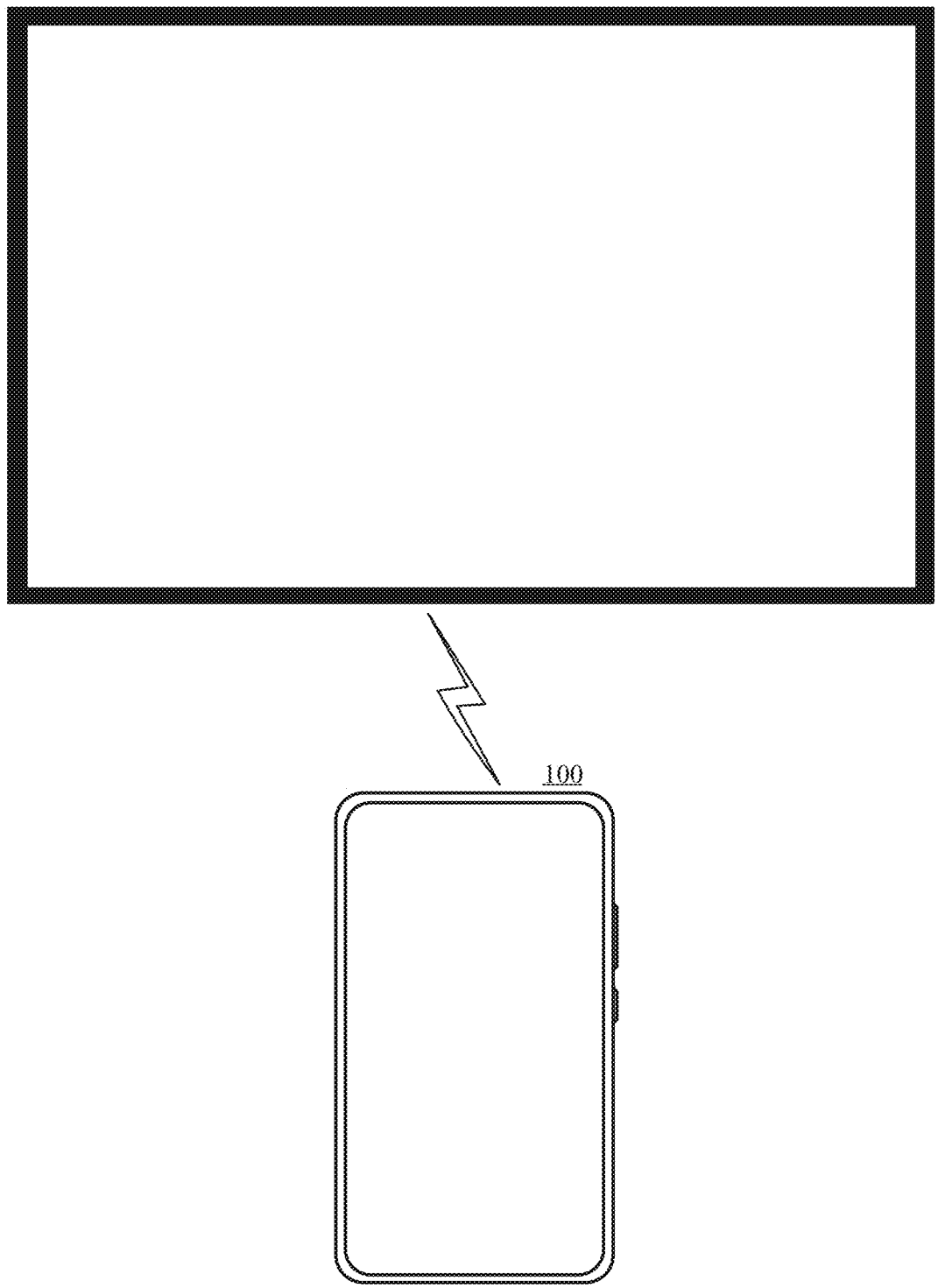
FIG. 1 is a schematic diagram of a communication system according to an embodiment of this application.

The following clearly describes technical solutions in embodiments of this application in detail with reference to the accompanying drawings. In the description of embodiments of this application, unless otherwise specified. "/" represents or. For example, A/B may represent A or B. "and/or" in the text merely describes an association relationship between associated objects and indicates that three relationships may exist. For example, A and/or B may indicate the following three cases: only A exists, both A and B exist, and only B exists.

The following terms "first" and "second" are merely used for description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two.

The following describes an implementation for resolving an intermittent stop in a screen projection process provided in this application.

When an electronic device such as a mobile phone detects an intermittent stop for screen projection on a large-screen device, the electronic device such as the mobile phone may reduce resolution of a surface in screen projection data when encoding data of a surface that is projected. After the electronic device such as the mobile phone sends the screen projection data to the large-screen device, the large-screen device may stretch and display, in an equal proportion, the obtained surface that is projected.

However, because the resolution of the surface that is projected decreases, the surface displayed on the large-screen device is blurred and unclear.

The following describes another implementation for resolving an intermittent stop in a screen projection process provided in this application.

When the electronic device such as the mobile phone detects an intermittent stop for screen projection on the large-screen device, the electronic device such as the mobile phone may, when encoding the screen projection data, maintain a resolution of a screen projection page of a focus window (a window currently operated) in the screen projection data, and reduce a resolution of a screen projection page of a non-focus window in the screen projection data. After the electronic device such as the mobile phone sends the screen projection data to the large-screen device, the large-screen may stretch and display, in an equal proportion, the obtained surface that is projected.

However, because the resolution of the screen projection page of the non-focus window decreases, some surfaces displayed on the large-screen device is blurred and unclear.

Therefore, this embodiment of this application provides a screen projection method, where an electronic device may mark a change range of a screen projection image frame (the change range may be referred to as a dirty region range, or may be referred to as a dirty region range, a dirty rectangle, or the like for short, and is a range in which a surface of an image of a frame changes relative to a surface of an image of a previous frame). The electronic device may send the dirty region range to the large-screen device. After the large-screen device receives the screen projection data, the large-screen device splits an interface in the dirty region range, and renders and displays the interface. For an image that is not in the dirty region range, the large-screen device continues to use a rendered image of a previous frame, avoiding a case in which a surface of a same frame is repeatedly rendered. Therefore, workload of a GPU of the large-screen device is reduced, and screen projection performance is improved.

The following describes a communication system provided in an embodiment of this application.

FIG. 1 is a schematic diagram of a communication system according to an embodiment of this application.

As shown in FIG. 1, the communication system 10 may include an electronic device 100 (also referred to as a first electronic device) and an electronic device 200 (also referred to as a second electronic device). The electronic device 100 may establish a wireless connection to the electronic device 200 in a wireless communication manner (for example, wireless fidelity (wireless fidelity, Wi-Fi), Bluetooth, and the like). The electronic device 100 may transmit file data to the electronic device 200 over a wireless connection. Alternatively, the electronic device 100 may project an application interface to the electronic device 200 for display, or the like. In the communication system 10, real-time data transmission may be controlled using a real time streaming protocol (Real Time Streaming Protocol, RTSP). RTSP is a multimedia streaming protocol used to control audio or video, and allows simultaneous control of a plurality of streaming requirements. The electronic device 100 may control transmission of a data stream through the RTSP.

For example, when the electronic device 100 performs a screen projection service through a Wi-Fi peer to peer (peer to peer, P2P) technology, the electronic device 100 may mix, compressed video in an H.264 format or audio in an advanced audio coding (advanced audio coding, AAC) format, into a transport stream (transport stream. TS) file, and sends the TS file to the electronic device 200 by using the RTSP protocol through Wi-Fi P2P. The electronic device 200 receives, by using the RTSP protocol, the TS file from the electronic device 100, decodes and plays the TS file. H.264 is a video codec protocol, and ACC is an audio codec protocol.

In this embodiment of this application, the electronic device 100 may be a mobile phone, a tablet computer, a desktop computer, a laptop computer, a handheld computer, a notebook computer, an ultra-mobile personal computer (ultra-mobile personal computer. UMPC), a netbook, a cellular telephone, a personal digital assistant (personal digital assistant, PDA), an augmented reality (augmented reality, AR) device, a virtual reality (virtual reality, VR) device, an artificial intelligence (artificial intelligence, AI) device, a wearable device, an in-vehicle device, a smart home device, a smart city device, and/or the like.

The electronic device 200 may be a television, a desktop computer, a laptop computer, a handheld computer, a notebook computer, an ultra-mobile personal computer, a netbook, an augmented reality device, a virtual reality device, an artificial intelligence device, an in-vehicle device, a smart home device, and the like.

In a possible implementation, the electronic device 100 may further be connected to the electronic device 200 through a transfer device. The transfer device includes a universal serial bus (universal serial bus. USB) interface that a data cable can be inserted into, and a Type-c interface for the data cable. The electronic device 100 may be inserted into the transfer device through the data cable. The transfer device may also be connected to the electronic device 200 through a transfer cable. The transfer cable may include any one of a high definition multimedia interface (high definition multimedia interface, HDMI) connection cable, a video graphics array (video graphics array, AGI) connection cable, and a digital visual interface (digital visual interface, DVI) connection cable, or the like. The transfer device in this embodiment of this application may be a mobile high-definition link (mobile high-definition link. MHL) device. The MHL device may simultaneously transmit audio or video signals in the electronic device 100 (for example, a mobile phone) to the electronic device 200 for display. The electronic device 100 may be used as a master device, and the electronic device 200 may be used as a slave device of the electronic device 100. After a connection between the electronic device 100 and the electronic device 200 is established, the electronic device 100 is equivalent to having two displays. One is a touchscreen of the electronic device 100, and the other is a display of the electronic device 200 connected to the electronic device 100.

The following describes a schematic diagram of a hardware structure of an electronic device according to an embodiment of this application.

Figure 2A:
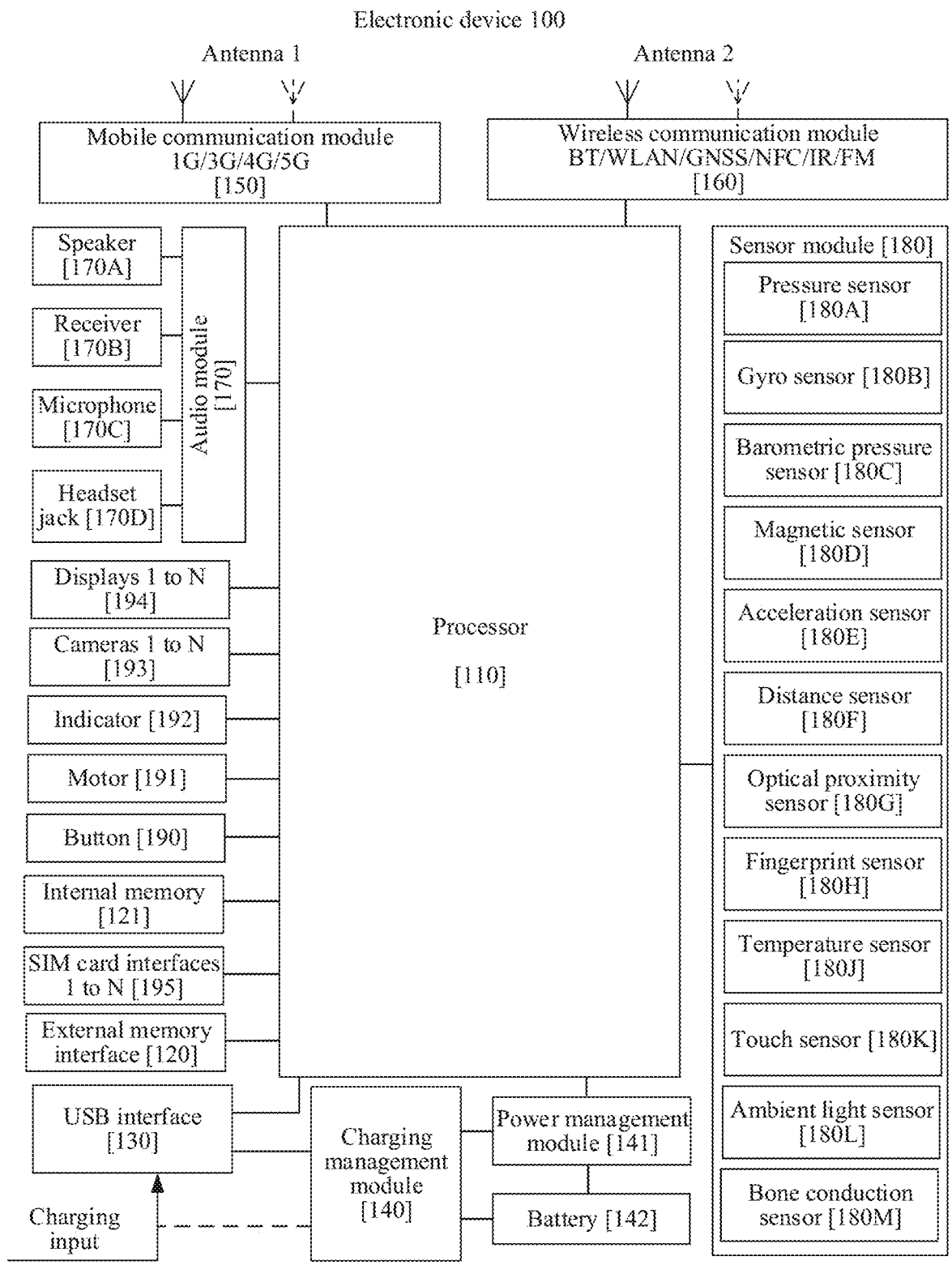
FIG. 2A is a schematic diagram of a hardware structure of an electronic device 100 according to an embodiment of this application.

FIG. 2A is a schematic diagram of a hardware structure of an electronic device 100.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may include more or fewer components than those shown in the figure, some components may be combined, some components may be split, or different component arrangements may be used. The components shown in the figure may be implemented by hardware, software, or a combination of software and hardware.

The processor 110 may include one or more processing units. For example, the processor 110 may include an application processor (application processor. AP), a modem processor, a graphics processing unit, an image signal processor (image signal processor, ISP), a controller, a video codec, a digital signal processor (digital signal processor, DSP), a baseband processor, a neural-network processing unit (neural-network processing unit. NPU), and/or the like. Different processing units may be independent devices, or may be integrated into one or more processors.

The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access, reduces a waiting time of the processor 110, and improves system efficiency.

In some embodiments, the processor 110 may include one or more interfaces. The interface may include an inter-integrated circuit (inter-integrated circuit. IIC) interface, an inter-integrated circuit sound (inter-integrated circuit sound, IIS) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output. GPIO) interface, a subscriber identity module (subscriber identity module, SIM) interface, a universal serial bus (universal serial bus, USB) interface, and/or the like.

It may be understood that an interface connection relationship between the modules that is shown in this embodiment of the present invention is merely an example for description, and does not constitute a limitation on the structure of the electronic device 100. In some other embodiments of this application, the electronic device 100 may alternatively use an interface connection manner different from that in the foregoing embodiment, or a combination of a plurality of interface connection manners.

The charging management module 140 is configured to receive charging input from a charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input through a wireless charging coil of the electronic device 100. When charging the battery 142, the charging management module 140 may further supply power to the electronic device through the power management module 141.

The power management module 141 is configured to connect the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be further configured to monitor a parameter such as a battery capacity, a battery cycle count, or a battery health status (electric leakage or impedance) In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further reused, to improve antenna utilization. For example, the antenna 1 may be reused as a diversity antenna of a wireless local area network. In some other embodiments, an antenna may be used in combination with a tuning switch.

The mobile communication module 150 may provide a solution for wireless communication such as 1G/3G/4G/5G applied to the electronic device 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 and at least some modules of the processor 110 may be disposed in a same device.

The modem processor may include a modulator and a demodulator. The modulator is configured to modulate a to-be-sent low-frequency baseband signal into a medium- and high-frequency signal. The demodulator is configured to demodulate a received electromagnetic wave signal into a low-frequency baseband signal. Then, the demodulator transmits the demodulated low-frequency baseband signal to the baseband processor for processing. The low-frequency baseband signal is processed by the baseband processor and then transmitted to the application processor. The application processor outputs sound signals through the audio device (not limited to speaker 170A, receiver 170B, and so on), or projects a page or video through the display 194. In some embodiments, the modem processor may be an independent device. In some other embodiments, the modem processor may be independent of the processor 110, and is disposed in a same device as the mobile communication module 150 or another functional module.

The wireless communication module 160 may provide a solution applied to the electronic device 100 for wireless communication including wireless local area networks (wireless local area networks, WLANs) (such as a wireless fidelity (wireless fidelity, Wi-Fi) network), Bluetooth (Bluetooth, BT), global navigation satellite system (global navigation satellite system. GNSS), frequency modulation (frequency modulation. FM), near field communication (near field communication, NFC), infrared (infrared, IR), and the like. The wireless communication module 160 may be one or more devices integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, and perform frequency modulation and amplification on the signal. The amplified signal is converted into an electromagnetic wave and radiated out via the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device through a wireless communication technology. The wireless communication technology may include a global system for mobile communications (global system for mobile communications, GSM), a general packet radio service (general packet radio service. GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC. FM, and/or an IR technology, and/or the like. The GNSS may include a global positioning system (global positioning system, GPS), a global navigation satellite system (global navigation satellite system. GLONASS), a BeiDou navigation satellite system (BeiDou navigation satellite system, BDS), a quasi-zenith satellite system (quasi-zenith satellite system. QZSS), and/or a satellite based augmentation system (satellite based augmentation systems, SBAS).

The electronic device 100 implements a display function through the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs that execute program instructions to generate or change display information.

The display 194 is configured to project a page, a video, and the like. The display 194 includes a display panel. The display panel may be a liquid crystal display (liquid crystal display. LCD), an organic light-emitting diode (organic light-emitting diode, OLED), an active-matrix organic light emitting diode (active-matrix organic light emitting diode, AMOLED), a flexible light-emitting diode (flex light-emitting diode. FLED), a mini-LED, a micro-LED, a micro-OLED, a quantum dot light emitting diode (quantum dot light emitting diode. QLED), and the like. In some embodiments, the electronic device 100 may include one or N displays 194, where N is a positive integer greater than 1.

The electronic device 100 may implement a photographing function through the ISP, the camera 193, the video codec, the GPU, the display 194, the application processor, and the like.

The ISP is configured to process data fed back by the camera 193. For example, during photographing, a shutter is opened. Light is transmitted to a photosensitive element of the camera through a lens. An optical signal is converted into an electrical signal. The photosensitive element of the camera transmits the electrical signal to the ISP for processing. The electrical signal is converted into an image visible to naked eyes. In addition, the ISP can optimize noise, luminance, and skin tone of the image. Moreover, the ISP can optimize a parameter such as exposure and color temperature of the photographing scene. In some embodiments, the ISP may be disposed in the camera 193.

The camera 193 is configured to capture a still image or a video. An optical image for an object is generated through the lens and is projected to the photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts the optical signal into an electrical signal, and then transmits the electrical signal to the ISP to convert it into a digital image signal. The ISP outputs the digital image signal to the DSP for processing. The DSP converts the digital image signal into an image signal in standard RGB and YUV format. In some embodiments, the electronic device 100 may include one or N cameras 193, and N is a positive integer greater than 1.

The digital signal processor is configured to process the digital signal. The digital signal processor may process other digital signals in addition to the digital image signal. For example, when the electronic device 100 selects a frequency, the digital signal processor is configured to perform Fourier transform on frequency energy and the like.

The video codec is configured to compress or decompress digital video. The electronic device 100 may support one or more video codecs. In this way, the electronic device 100 may play or record videos in a plurality of encoding formats, for example, moving picture experts group (moving picture experts group, MPEG)-1, MPEG-1, MPEG-3, MPEG-4, and the like.

The NPU is a neural-network (neural-network, NN) computation processor. The NPU quickly processes input information by referring to a structure of a biological neural network, for example, by referring to a mode of transmission between human brain neurons, and continuously performs self-learning. Applications such as intelligent cognition of the electronic device 100 may be implemented through the NPU, for example, image recognition, facial recognition, speech recognition, text understanding, and the like.

The external memory interface 120 may be configured to connect to an external storage card, for example, a micro SD card, to extend a storage capability of the electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 executes various function applications and data processing of the electronic device 100 by running the instructions stored in the internal memory 121. The internal memory 121 may include a program storage area and a data storage area. The program storage area may store an operating system, an application required by at least one function (such as a sound playing function or an image playing function), and the like. The data storage area may store data (for example, audio data or a phone book) created during use of the electronic device 100, and the like. In addition, the internal memory 121 may include a high-speed random access memory, and may further include a nonvolatile memory, for example, at least one magnetic disk storage device, a flash memory, or a universal flash storage (universal flash storage, UFS).

The electronic device 100 may implement audio functions, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal.

The speaker 170A, also referred to as a "horn", is configured to convert an audio electrical signal into a sound signal.

The receiver 170B, also referred to as an "earpiece", is configured to convert an audio electrical signal into a sound signal.

The microphone 170C, also referred to as a "mike" or a "mic", is configured to convert the sound signal into an electrical signal.

The pressure sensor 180A is configured to sense a pressure signal, and can convert the pressure signal into an electrical signal. In some embodiments, the pressure sensor 180A may be disposed on the display 194. The gyro sensor 180B may be configured to determine a motion posture of the electronic device 100. The barometric pressure sensor 180C is configured to measure the barometric pressure. The magnetic sensor 180D includes a Hall sensor, and opening and closing of a flip cover may be detected by using the magnetic sensor 180D. The acceleration sensor 180E may detect magnitudes of accelerations of the electronic device 100 in all directions (usually on three axes). The distance sensor 180F is configured to measure a distance. The optical proximity sensor 180G may also be used in a flip cover mode or a pocket mode to automatically perform screen unlocking or locking. The ambient light sensor 180L is configured to sense ambient brightness. The fingerprint sensor 180H is configured to collect fingerprints. The temperature sensor 180J is configured to detect the temperature. The touch sensor 180K is also referred to as a "touch panel". The touch sensor 180K may be disposed on the display 194. The touch sensor 180K and the display 194 constitute a touchscreen, which is also referred to as a "touchscreen" The touch sensor 180K is configured to detect a touch operation performed on or near the touch sensor. The touch sensor may transfer the detected touch operation to the application processor, to determine a type of a touch event. The display 194 may provide a visual output related to the touch operation. In some other embodiments, the touch sensor 180K may alternatively be disposed on a surface of the electronic device 100, and is at a location different from that of the display 194. The bone conduction sensor 180M may obtain a vibration signal. The button 190 includes a power button, a volume button, and the like. The motor 191 may generate a vibration alert. The indicator 192 may be an indicator light, and may be configured to indicate a charging status and a power change, or may be configured to indicate a message, a missed call, a notification, and the like. The SIM card interface 195 is configured to connect to a SIM card.

The following describes a diagram of a software structure of an electronic device 100 according to an embodiment of the present invention.

A software system of the electronic device 100 may use a layered architecture, an event-driven architecture, a micro-kernel architecture, a micro service architecture, or a cloud architecture. In this embodiment of the present invention, an Android system with the layered architecture is used as an example to illustrate a software structure of the electronic device 100.

Figure 2B:
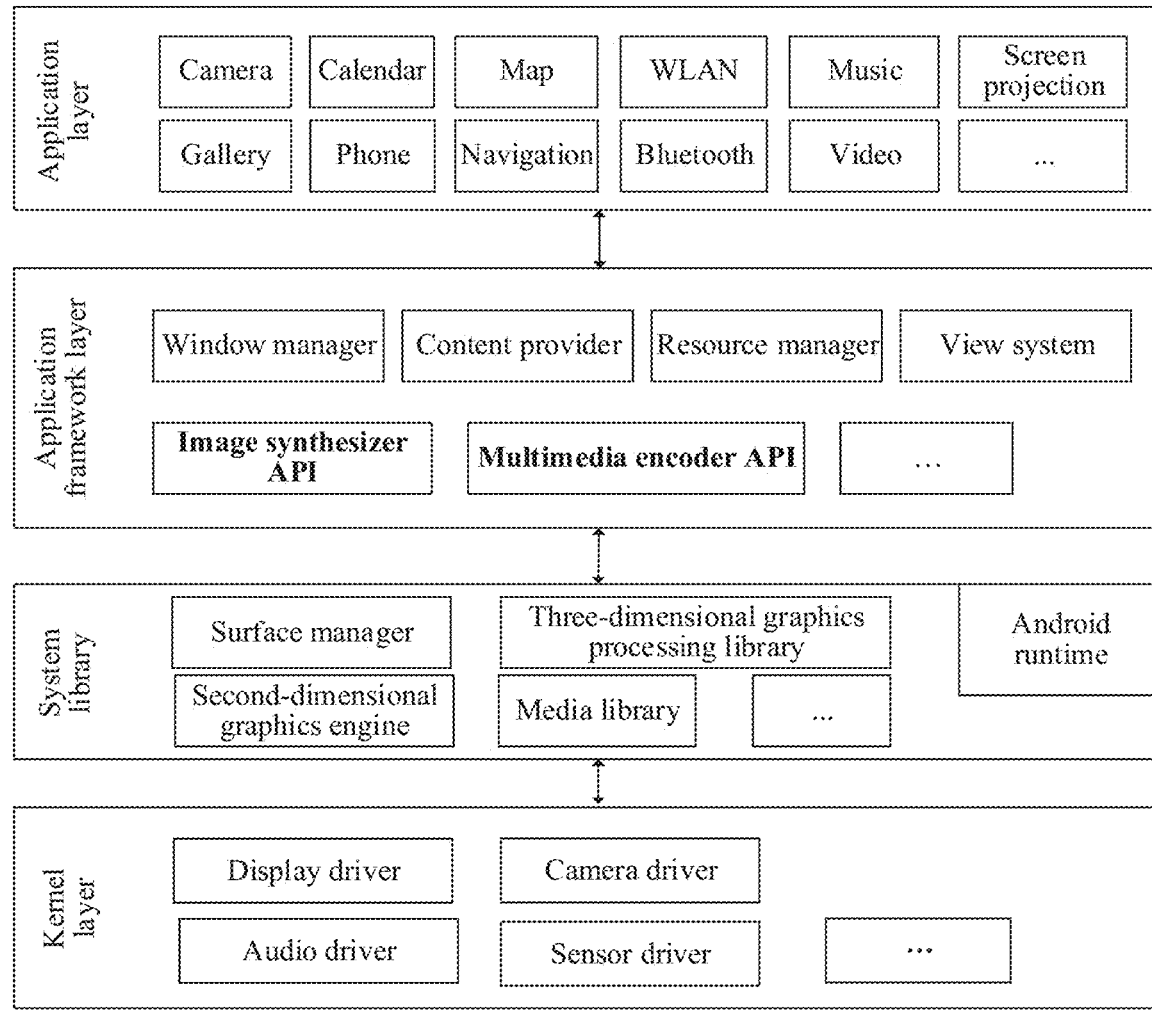
FIG. 2B is a block diagram of a software structure of an electronic device 100 according to an embodiment of this application.

FIG. 2B is a block diagram of a software structure of an electronic device 100 according to an embodiment of the present invention.

A layered architecture divides software into several layers, with each layer having a clear role and responsibilities. The layers communicate with each other through software interfaces. In some embodiments, an Android system is divided into four layers from top to bottom: an application layer: an application framework layer; an Android runtime (Android runtime) and a system library; and a kernel layer.

The application layer may include a series of application packages.

As shown in FIG. 2B, the application package may include applications such as Camera, Gallery, Calendar, Phone, Map, Navigation, WLAN, Bluetooth, Music, Video, and Screen projection.

The application framework layer provides an application programming interface (application programming interface. API) and a programming framework for the applications in the application layer. The application framework layer includes some predefined functions.

As shown in FIG. 2B, the application framework layer may include a window manager, a content provider, a view system, a resource manager, an image synthesizer API, a multimedia encoder API, and the like.

The window manager is configured to manage a windowing program. The window manager may obtain a size of a display, determine whether there is a status bar, perform screen locking, perform screen capturing, and so on.

The content provider is configured to store and retrieve data and make the data accessible to an application. The data may include a video, an image, audio, phone calls made and answered, a browsing history, favorites, a phone book, and the like.

The view system includes a visual control, for example, a control for displaying text or a control for displaying a picture. The view system may be configured to build an application. A display interface may include one or more views. For example, a display interface including an SMS notification icon may include a view for displaying text and a view for displaying a picture.

The image synthesizer API can invoke related service processes to synthesize UI data of each layer into one layer, which can work with the encoder. The image synthesizer module API may further learn that whether a screen projection interface is changed.

The resource manager provides a variety of resources, such as localized character strings, icons, pictures, layout files, video files, and so on, for applications.

The multimedia encoder API can invoke related service processes to create encoders/decoders of specific types (for example, audio and video file types such as "video/avc"). For example, the multimedia encoder may encode and decode, based on a H.264 video encoding and decoding protocol, image data synthesized by a virtual display module.

Android Runtime includes a kernel library and a virtual machine. The Android runtime is responsible for scheduling and managing an Android system.

The kernel library includes two parts: one part being functional functions that java needs to invoke, and the other part being an Android kernel library.

The application layer and the application framework layer run in the virtual machine. The virtual machine executes java files of the application layer and the application framework layer as binary files. The virtual machine is configured to perform functions, such as object life cycle management, stack management, thread management, security and exception management, and garbage collection.

The system library may include a plurality of functional modules. For example, the functional modules include a surface manager (surface manager), a media library (Media Library), a three-dimensional graphics processing library (for example, OpenGL ES), a 2D graphics engine (e.g., SGL), and the like.

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video encoding formats, such as MPEG4, H.264, MP3, AAC, AMR, JPG, and PNG.

The three-dimensional graphics processing library is configured to implement three-dimensional drawing, image rendering, synthesizing, and layer processing.

The 2D graphics engine is a drawing engine for 2D drawing.

The kernel layer is a layer between hardware and software. The kernel layer includes at least a display driver, a camera driver, an audio driver, and a sensor driver.

The following describes a schematic diagram of a hardware structure of an electronic device 200 according to an embodiment of this application.

Figure 3:
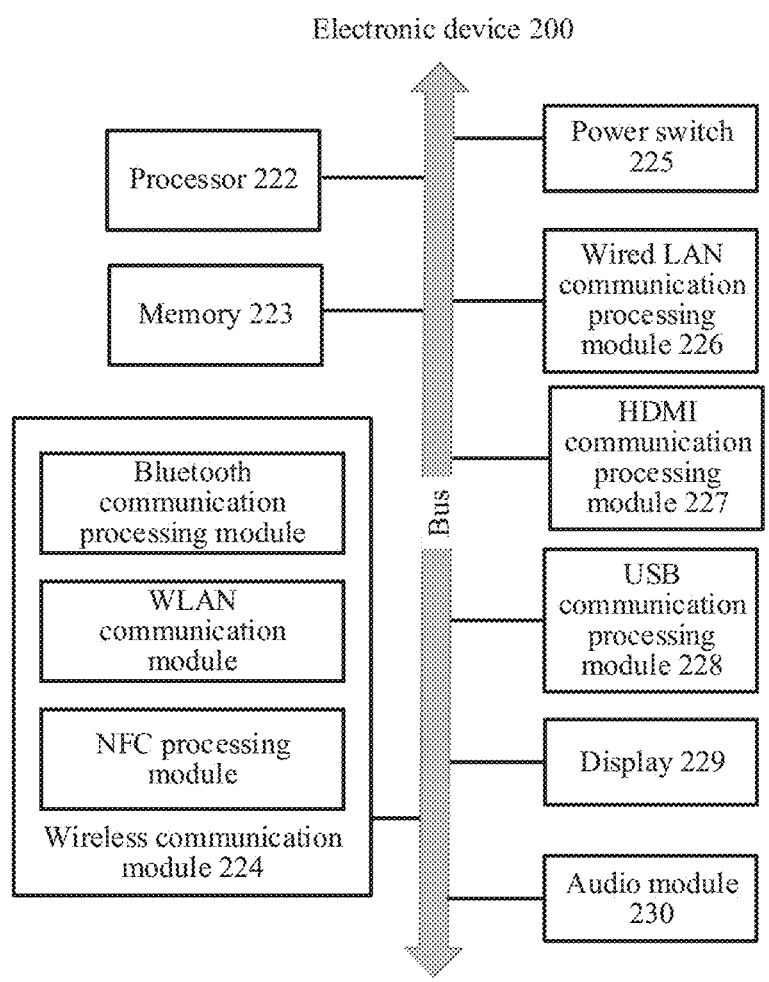
FIG. 3 is a schematic diagram of a hardware structure of an electronic device 200 according to an embodiment of this application.

As shown in FIG. 3, the electronic device 200 may include: a processor 222, a memory 223, a wireless communication module 224, a power switch 225, a display 229, and an audio module 230. In some embodiments, the electronic device 200 may further include a wired LAN communication processing module 226, a high definition multimedia interface (high definition multimedia interface, HDMI) communication processing module 227, a USB communication processing module 228, and the like. The foregoing modules may be connected through a bus. Specifically:

The processor 222 may be configured to read and execute computer readable instructions. During specific implementation, the processor 222 may mainly include a controller, a calculator, and a register. The controller is mainly responsible for decoding instructions, and sending a control signal for an operation corresponding to the instructions. The calculator is mainly responsible for performing fixed-point or floating-point arithmetic operations, shift operations, logic operations, and the like, and may also be responsible for performing address operations and conversions. The register is mainly responsible for storing the register operands and intermediate operation results that are temporarily stored during instruction execution. In a specific implementation, a hardware architecture of the processor 222 may be an application-specific integrated circuit (ASIC) architecture, a MIPS architecture, an ARM architecture, an NP architecture, or the like.

In this embodiment of this application, the processor 222 may be configured to parse a signal received by the wireless communication module 224, for example, a new URL sent by the electronic device 100, and obtain a plurality of videos and associated videos in the playlist based on the new URL.

The wireless communication module 224 may include a WLAN communication processing module. Optionally, the wireless communication module 224 may further include a Bluetooth (BT) communication processing module, an NFC processing module, a cellular mobile communication processing module (not shown), and the like.

In this embodiment of this application, the wireless communication module 224 may be configured to establish a communication connection to the electronic device 100. There may be a plurality of types of communication connections established between the wireless communication module 224 and the electronic device 100. For example, the WLAN communication processing module may be configured to establish a Wi-Fi direct communication connection to the electronic device 100. The Bluetooth (BT) communication processing module may be configured to establish a Bluetooth communication connection to the electronic device 100. The NFC processing module may be configured to establish an NFC connection to the electronic device 100, and the like.

In this embodiment of this application, the wireless communication module 224 may be further configured to establish a communication connection to the electronic device 100, and receive, based on the communication connection, a video stream sent by the electronic device 100. The communication connection established between the wireless communication module 224 and the electronic device 100 may be used for data transmission based on an HTTP protocol. A type of the communication connection between devices and a data transmission protocol are not limited in this application.

The memory 223 is coupled to the processor 222, and is configured to store various software programs and/or a plurality of sets of instructions. In a specific implementation, the memory 223 may include a high-speed random access memory, and may further include a non-volatile memory, for example, one or more disk storage devices, a flash storage device, or another non-volatile solid-state storage device. The memory 223 may store an operating system, for example, an embedded operating system such as uCOS. VxWorks, or RTLinux. The memory 223 may further store a communication program, and the communication program may be used to communicate with the electronic device 100, one or more servers, or an additional device.

The power switch 225 may be configured to control the power supply to supply power to the electronic device 200.

The wired LAN communication processing module 226 may be configured to communicate with another device in a same LAN through a wired LAN, or may be configured to connect to a WAN through the wired LAN, and may communicate with a device in the WAN.

The HDMI communication processing module 227 may be configured to communicate with another device through an HDMI interface (not shown).

The USB communication processing module 228 may be configured to communicate with another device through a USB interface (not shown).

The display 229 may be configured to project a page, a video, and the like. The display 229 may be a display such as an LCD, an OLED, an AMOLED, a FLED, or a QLED. For content displayed on the display 229, refer to related descriptions in subsequent method embodiments.

In this embodiment of this application, the display 229 may continuously play the plurality of videos based on the video streams of the plurality of videos, such as the playlist and the associated videos, that are sent by the server 300 and that are received by the wireless communication module 224.

The audio module 230. The audio module 230 may be configured to output an audio signal through an audio output interface, so that a large-screen display device 200 can support audio play. The audio module 230 may be further configured to receive audio data through an audio input interface. The audio module 230 may include but is not limited to: a microphone, a speaker, a receiver, and so on.

In some embodiments, the electronic device 200 may further include a serial interface such as an RS-232 interface. The serial interface can be connected to other devices, for example, an audio amplifier such as a speaker, so that the display and the audio amplifier cooperate to play audio and video.

It may be understood that the structure shown in FIG. 3 does not constitute a specific limitation on the electronic device 200. In some other embodiments of this application, the electronic device 200 may include more or fewer components than those shown in the figure, some components may be combined, some components may be split, or different component arrangements may be used. The components shown in the figure may be implemented by hardware, software, or a combination of software and hardware.

In some embodiments, the electronic device 200 may include hardware included in the electronic device 100 shown in FIG. J. Various components shown may be implemented in hardware, software, or in a combination of hardware and software that includes one or more signal processing and/or application-specific integrated circuits.

A software system of the electronic device 200 may use a layered architecture, an event-driven architecture, a micro-kernel architecture, a micro service architecture, a cloud architecture, or the like. For example, the software system of the electronic device 200 may include but is not limited to iOS®, Android®, Harmony®, Windows, Linux, or another operating system. Harmony® is Huawei's HarmonyOS.

FIG. 4A to FIG. 4I are schematic diagrams of interfaces of a set of screen projection scenarios according to an embodiment of this application.

In some application scenarios, after the electronic device 100 establishes a first connection to the electronic device 200, the electronic device 100 may synthesize a plurality of application interfaces into a screen projection image frame of a frame. In addition, the electronic device 100 may identify a region (a dirty region range) in which the screen projection image frame changes compared with a screen projection image frame of a previous frame. The electronic device 100 may send data such as the screen projection image frame and the dirty region range to the electronic device 200. The electronic device 200 may perform related processing on the screen projection image frame and display. In addition, the electronic device 100 and the electronic device 200 may seamlessly share files such as pictures and videos. A user may further quickly process, on the electronic device 200, messages and files of the electronic device 100 through an input device. First, the electronic device 200 may display any interface (for example, a desktop). After receiving a screen projection request from the electronic device 100, the electronic device 200 may display a screen projection window above the current interface. The screen projection window displays an application interface projected by the electronic device 100. After the electronic device 200 receives and agrees to the screen projection request from the electronic device 100, the electronic device 200 may receive the application interface of the electronic device 100 and display.

Figure 4A:
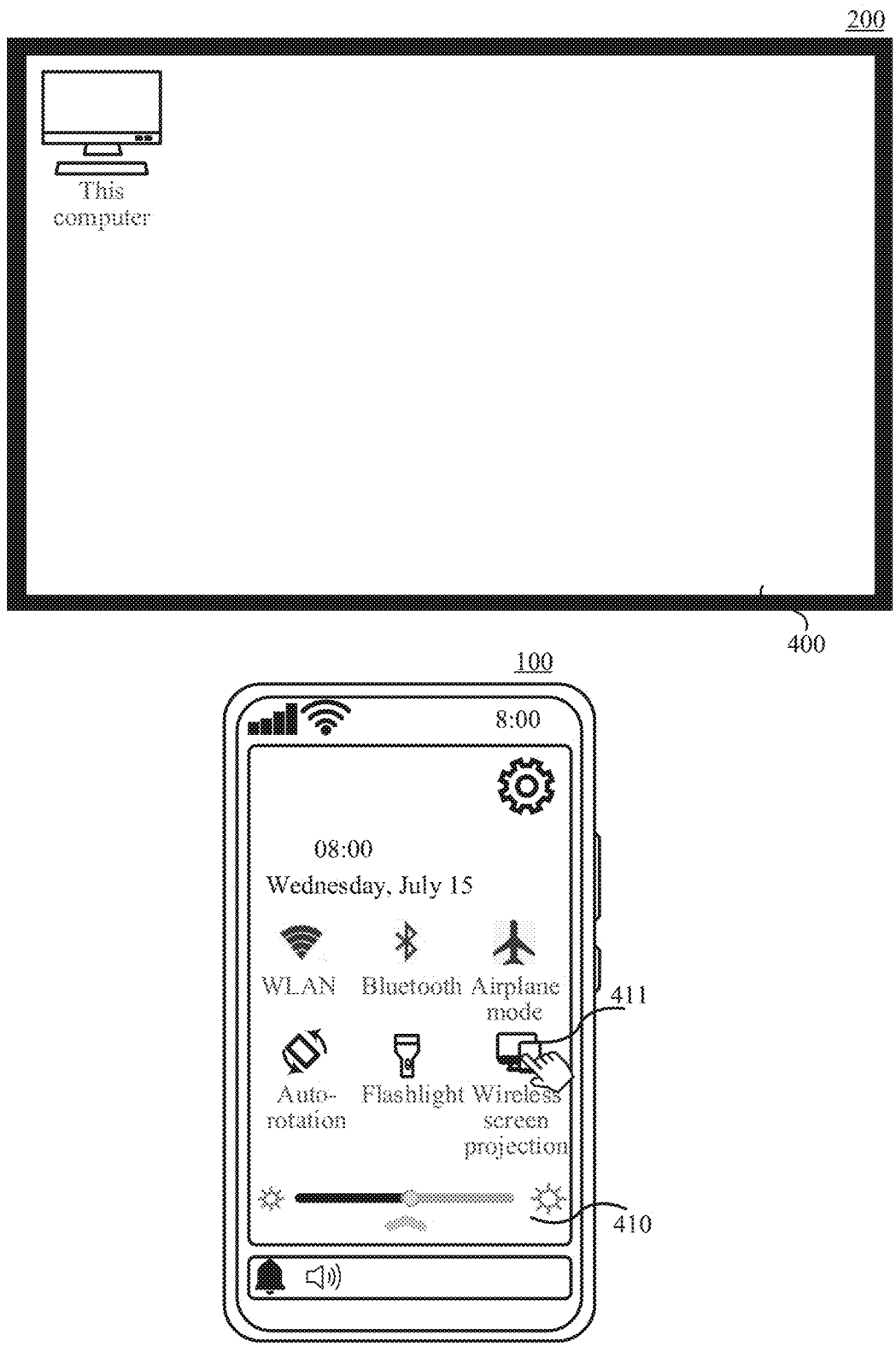
FIG. 4A to FIG. 4I are schematic diagrams of interfaces of a set of screen projection scenarios according to an embodiment of this application.

For example, as shown in FIG. 4A, the electronic device 100 may display a drop-down menu window 410. The drop-down menu window 410 may include a wireless screen projection control 411 and a switch control of another function (for example, a WLAN switch control, a Bluetooth control, an airplane mode switch control, an auto-rotation switch control, a flashlight switch control, and the like). The wireless screen projection control 411 may be configured to trigger the electronic device 100 to establish a WLAN direct connection to another device, and send data displayed on the electronic device 100 to the another device for display. The electronic device 200 may display a user interface 400. The user interface 400 may display an icon including but not limited to an icon of. This computer.

The electronic device 100 may receive an input operation (for example, clicking) of the user for the wireless screen projection control 411. In response to the operation, the electronic device 100 displays a device selection interface 420 that may be displayed in FIG. 4B.

Figure 4B:
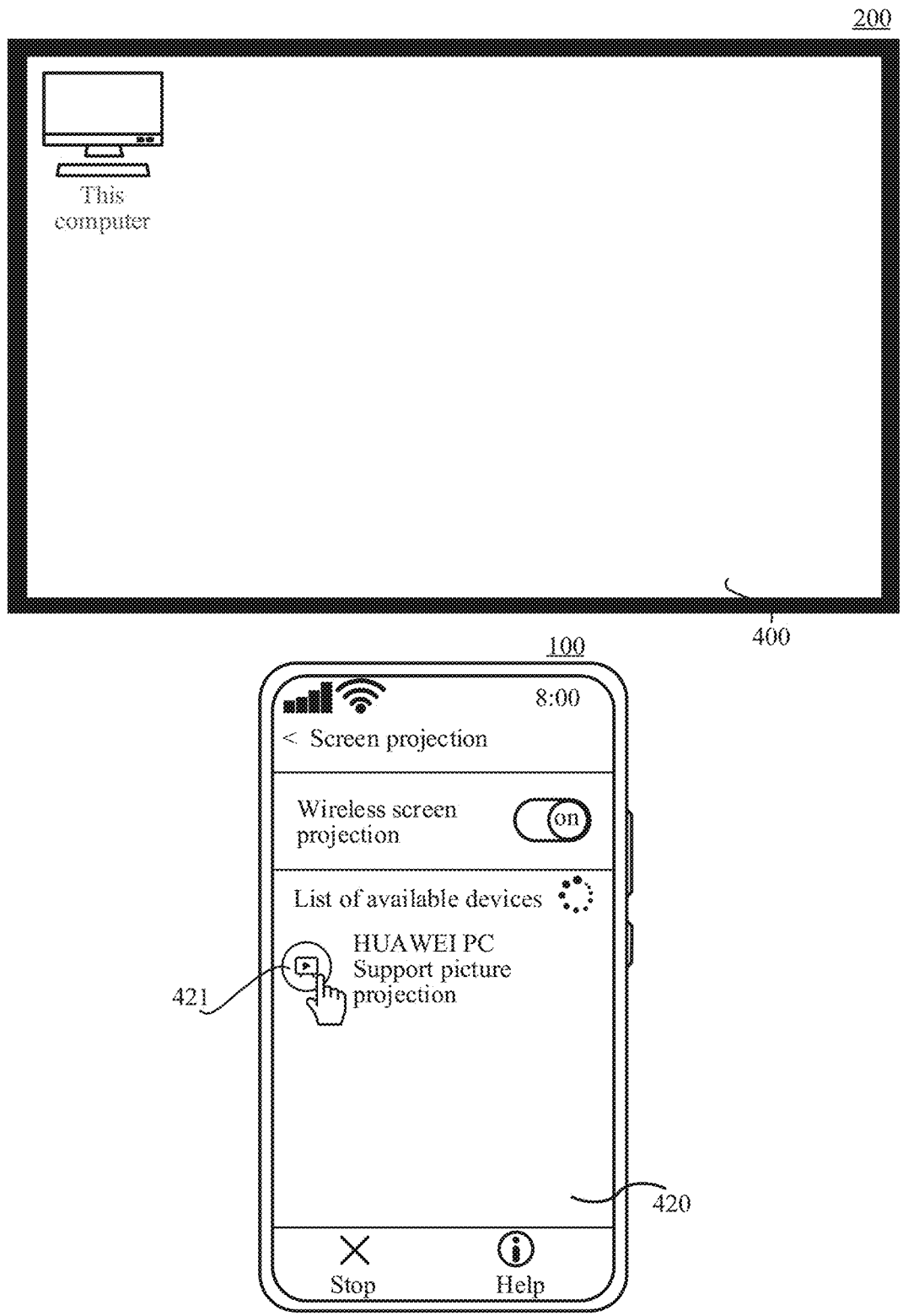

As shown in FIG. 4B, the device selection interface 420 may include one or more device options, where the one or more device options include a device option 421 corresponding to the electronic device 200. A device name of the electronic device 200 may be "HUAWEI PC", and the device name (for example, "HUAWEI PC") of the electronic device 200 may be displayed on the device option 421.

The electronic device 100 may receive input (for example, clicking) of the user for the device option 421. In response to the input, the electronic device 100 may send a screen projection connection request to the electronic device 200. After the electronic device 200 receives the screen projection connection request, the electronic device 200 may display a screen projection prompt window 431 shown in FIG. 4C.

Figure 4C:
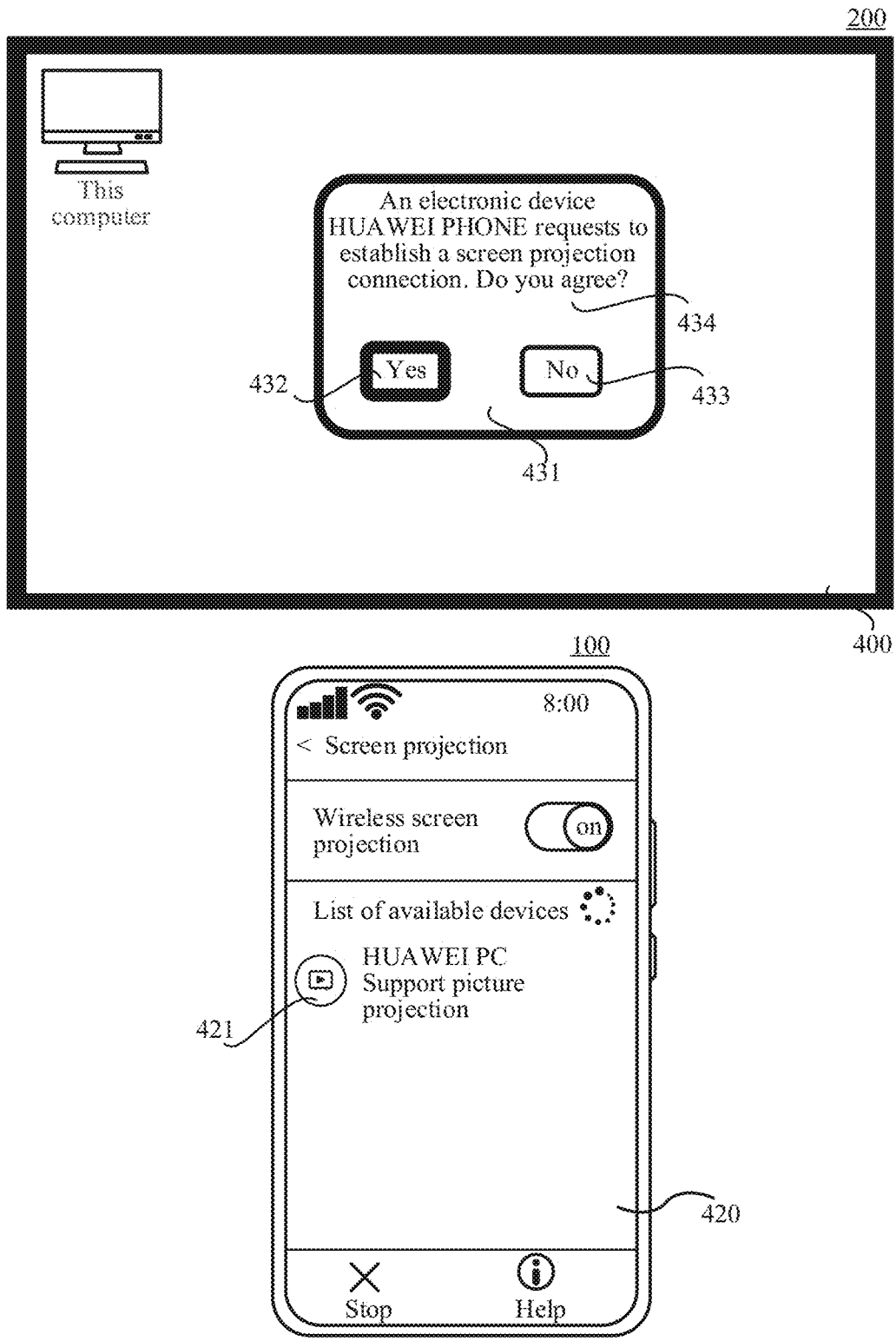

As shown in FIG. 4C, the prompt window 431 displayed on the electronic device 200 may include a confirmation control 432, a rejection control 433, and a text prompt 434. The text prompt 434 may prompt the user to confirm, on the electronic device 200, whether to accept the screen projection request from the electronic device 100. For example, the text prompt may be "An electronic device HUAWEI PHONE requests to establish a screen projection connection. Do you agree?" The confirmation control 432 may be configured to trigger the electronic device 200 to accept the screen projection connection request from the electronic device 100. The rejection control 433 may be configured to trigger the electronic device 200 to reject the screen projection connection request from the electronic device 100.

The electronic device 200 may receive input (for example, clicking) that is applied by the user to the confirmation control 432. In response to the input, the electronic device 200 may establish the WLAN direct connection to the electronic device 100. After the electronic device 100 establishes the WLAN direct connection to the electronic device 200, the electronic device 100 may project, in real time through the WLAN direct connection, a surface displayed on the screen of the electronic device 100 to the screen of the electronic device 200 for display. In particular, the electronic device 100 may send, to the electronic device 200, screen projection data that includes a screen projection image frame 1 and dirty region range information 1. The electronic device 200 may crop and render an image within the dirty region range, and display the image in the screen projection window.

Figure 4D:
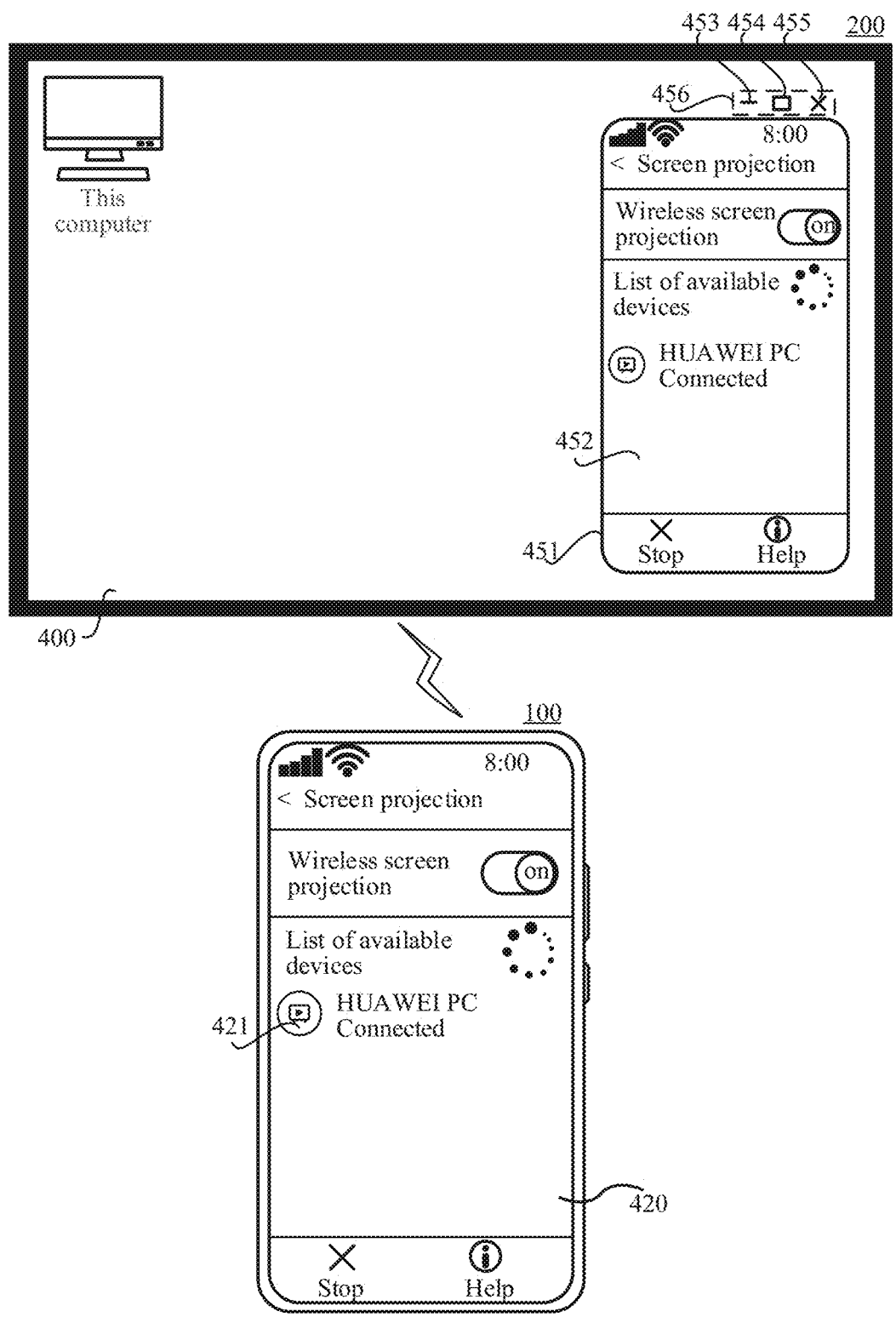

For example, as shown in FIG. 4D, the device selection interface 420 is currently displayed on the screen of the electronic device 100. The electronic device 100 may project the device selection interface 420 to the electronic device 200 for display. The electronic device 200 may display a screen projection window 451 and a screen projection window function menu 456. The screen projection window function menu 456 is a function menu of the screen projection window 451. The screen projection window function menu 456 includes a minimize window control 453, a maximize window control 454, and a close window control 455. The minimize window control 453 may be configured to minimize the screen projection window 451. The maximize window control 454 may be configured to maximize the screen projection window 451. The close window control 455 may be configured to close the screen projection window 451. Each screen projection window may correspond to a screen projection window function menu. The screen projection window 451 may display a screen projection page 452.

Content of the screen projection page 452 is the same as content of the device selection interface 42 of the electronic device 100. The electronic device 200 may receive input of the user for the screen projection page 452, and send input information (including location information and action information input by the user) to the electronic device 100. The electronic device 100 may make a corresponding response based on the received input information, and update the device selection interface 420. The electronic device 100 may further send the updated surface of the device selection interface 420 to the electronic device 200.

After the electronic device 200 receives the surface sent by the electronic device 100, the electronic device 200 may display the updated surface of the device selection interface 420 in the screen projection window 451.

The electronic device 100 may receive input (for example, swiping up) of the user. In response to the input, the electronic device 100 may display a user interface 460 shown in FIG. 4E. The electronic device 100 may send, to the electronic device 200, screen projection data that includes a screen projection image frame 2 and dirty region range information 2. The electronic device 200 may crop and render an image within the dirty region range, and display the image in the screen projection window.

Figure 4E:
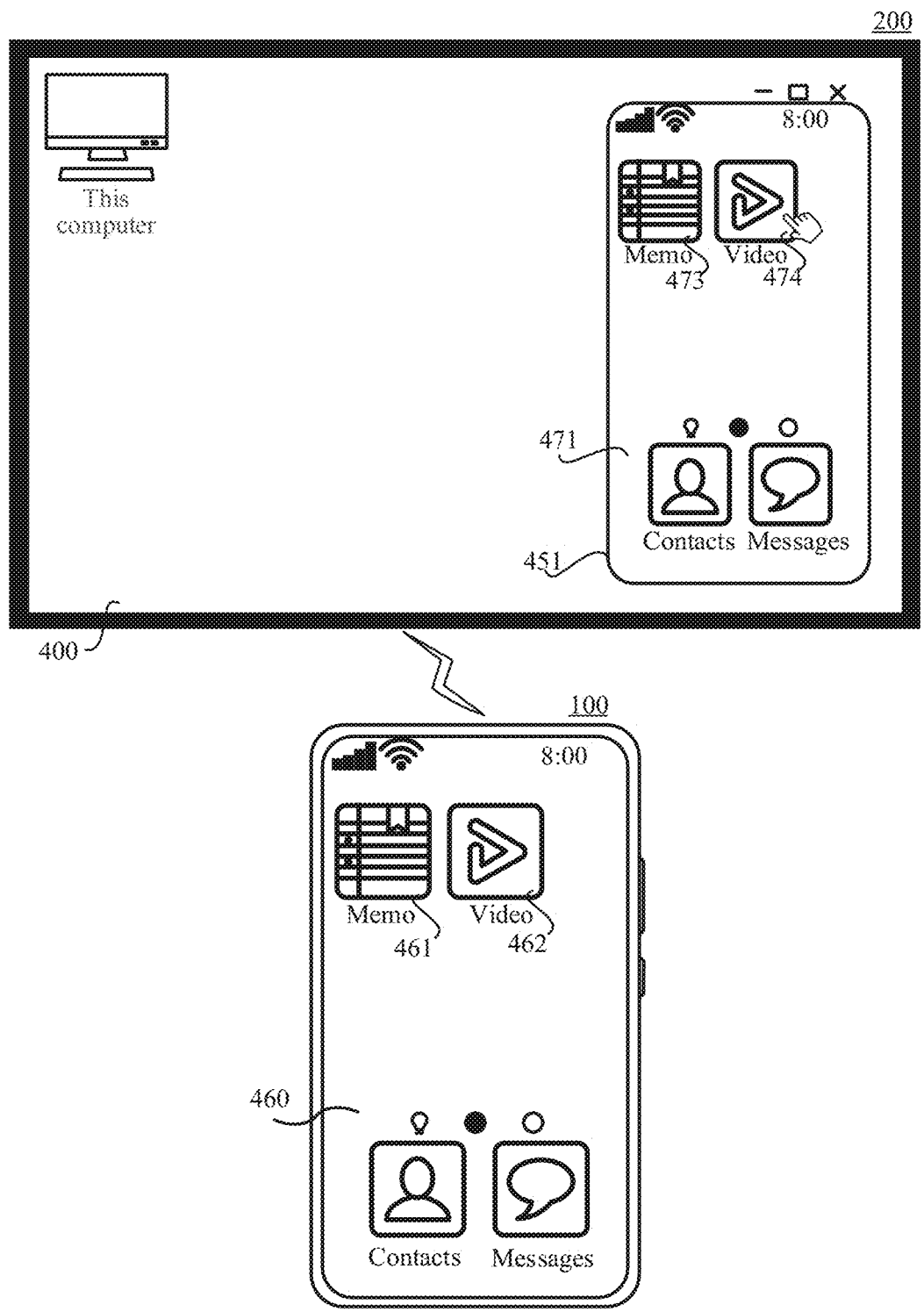

For example, as shown in FIG. 4E, the user interface 460 may include an icon 461 of Memo, an icon 462 of Video, an icon of Contacts, and an icon of Messages. The icon 461 of Memo may be used to start a "Memo" application, and display an interface of the "Memo" application. The icon 462 of Video may be used to start a "Video" application, and display an interface of the "Video" application. The user interface 460 may further include a page indicator. Application icons may be distributed across a plurality of pages, and the page indicator may be used for an application in just which page the user is currently browsing. The user may swipe left or right of the region of the user interface 460 to browse other pages. The user interface 460 may be a home interface. The electronic device 100 may project the user interface 460 to the electronic device 200 for display.

The electronic device 200 may display the screen projection window 451, and the screen projection window 451 may display a screen projection page 471. Content of the screen projection page 471 is the same as content of the user interface 460 of the electronic device 100. The screen projection page 471 includes an icon 473 of Memo, an icon 474 of Video, and the like. For the icon 473 of Memo, refer to the icon 461 of Memo. For the icon 474 of Video, refer to the icon 462 of Video.

The electronic device 200 may receive input (for example, touch and hold) of the user for the icon 474 of Video. In response to the input, the electronic device 200 may send input information corresponding to the input operation (the input information includes a location and a type of the input operation) to the electronic device 100. The electronic device 100 may display a menu window 463 in response to the input information. Then, the electronic device 100 may send, to the electronic device 200, data that includes a screen projection image frame 3 and dirty region range information 3. The electronic device 200 may crop and render an image within the dirty region range, and display the image in the corresponding screen projection window. The electronic device 200 may display a screen projection page 472 shown in FIG. 4F. Content of the screen projection page 472 is the same as content of the user interface 460 currently displayed on the electronic device 100.

Figure 4F:
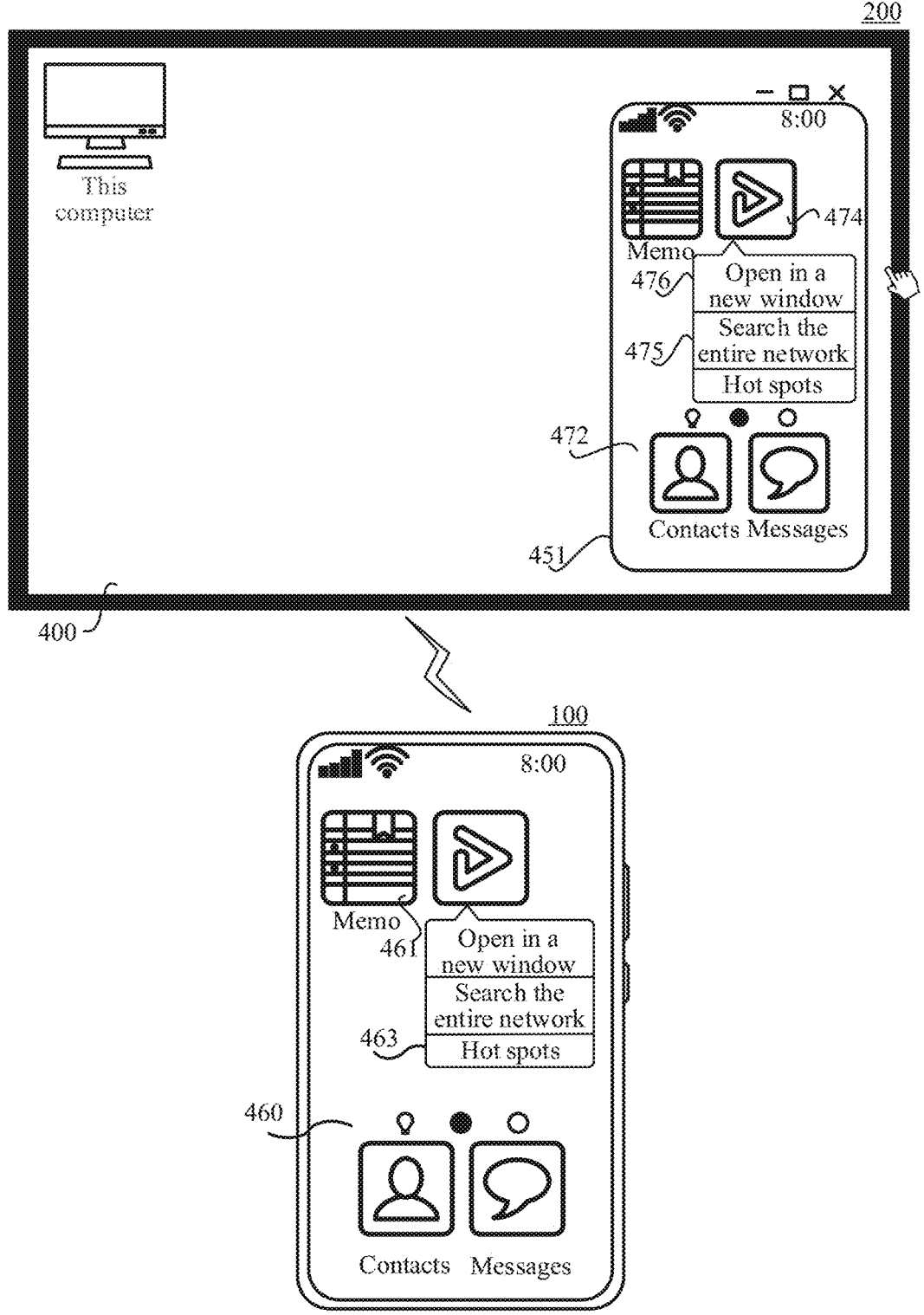

As shown in FIG. 4F, the screen projection page 472 includes the icon 473 of Memo, a menu window 475, and the like. The menu window 475 may include but is not limited to an option of opening in a new window 476, an option of searching the entire network, and an option of hot spots.

The electronic device 200 may receive input (e.g., click) of the user for the option of opening in a new window 476. In response to the input, the electronic device 200 may first send input information to the electronic device 100. In response to the input, the electronic device 100 may synthesize a Video application interface and the home interface into a screen projection image frame 4 of a frame. The electronic device 100 may send, to the electronic device 200, data that includes the screen projection image frame 4 and dirty region range information 4. The electronic device 200 may crop and render an image within the dirty region range, and display the image in the corresponding screen projection window. (For example, a screen projection page 482 and a screen projection page 473 shown in FIG. 4G). The electronic device 200 may further discard a surface outside the dirty region range in the surface, and display a screen projection page of a previous frame in a corresponding screen projection window. For description of the dirty region range, refer to a subsequent embodiment. Details are not described herein again.

Figure 4G:
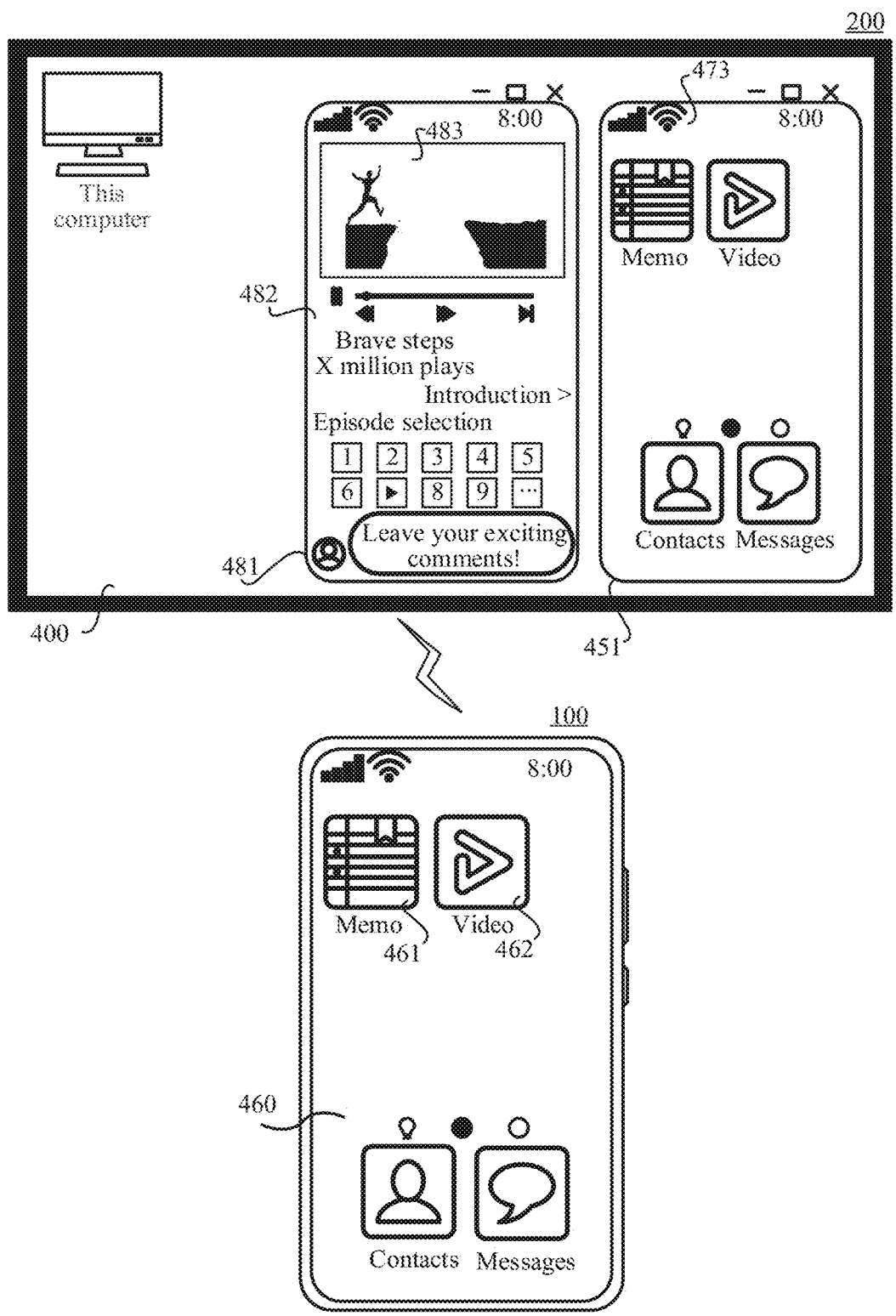

As shown in FIG. 4G, the electronic device 200 displays the user interface 400, where the user interface 400 includes the screen projection window 451 and a screen projection window 481. The screen projection window 451 displays a screen projection page 473, and content of the screen projection page 473 is the same as content of the user interface 460 currently displayed on the electronic device 100. The screen projection window 481 displays the screen projection page 482. The screen projection page 482 is a real-time surface of the Video application interface sent by the electronic device 100. The screen projection page 482 includes a play window 483, and the play window 483 is playing a video.

Figure 8A:
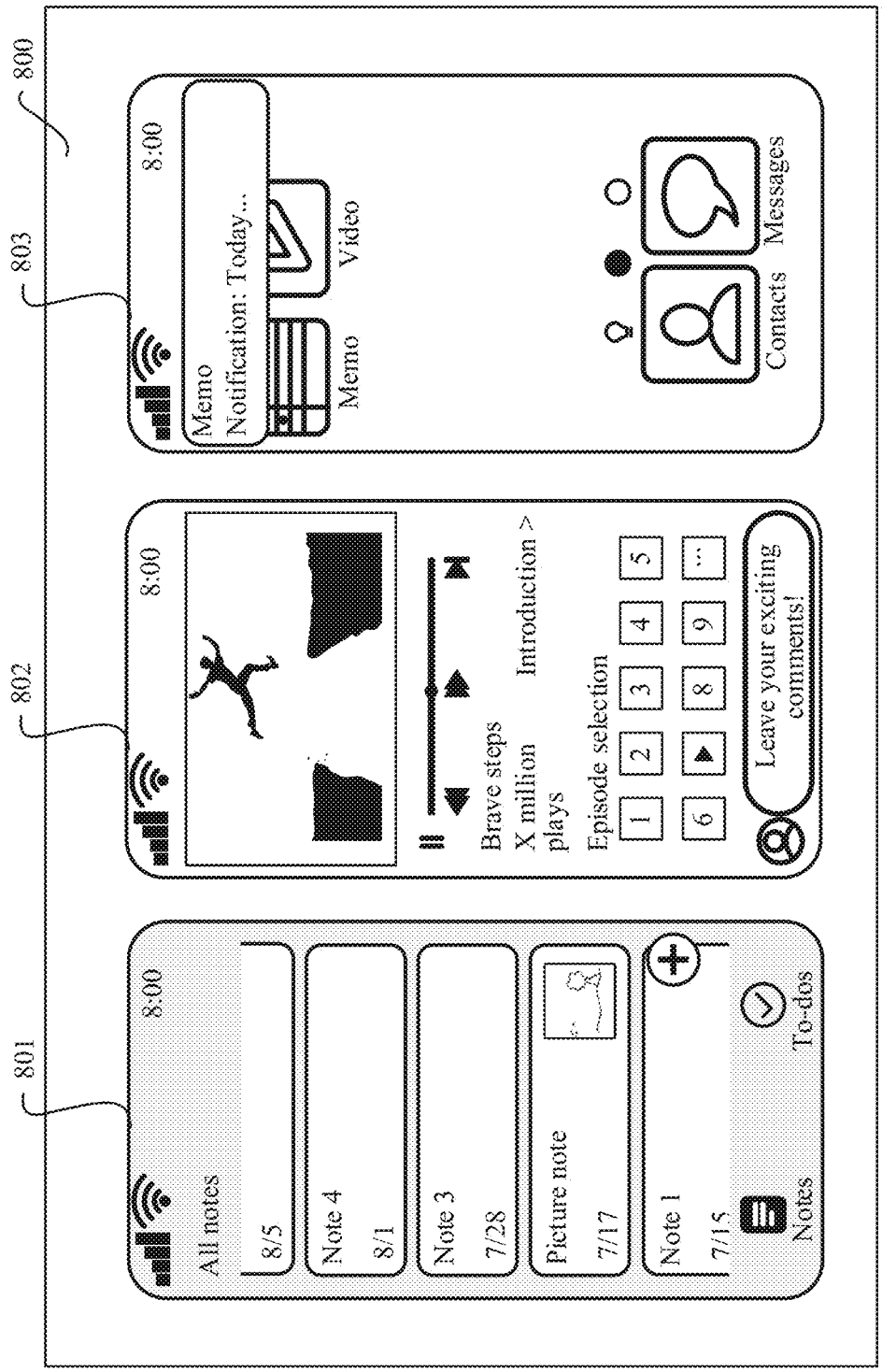
FIG. 8A and FIG. 8B are schematic diagrams of splitting a set of screen projection surfaces according to an embodiment of this application.

The electronic device 200 may receive an input operation (for example, dragging the icon of Memo) of the user. In response to the input operation, the electronic device 200 may first send input information corresponding to the input operation to the electronic device 100. In response to the input information, the electronic device 100 may synthesize a Memo application interface, the Video application interface, and the home interface into a screen projection image frame A of a frame (for example, a screen projection image frame 800 shown in FIG. 8A). The electronic device 100 may further mark a dirty region range of the screen projection image frame A, to obtain dirty region range information A. The electronic device 100 may further encapsulate the dirty region range information A based on the RTSP protocol. Then, the electronic device 100 may send the screen projection data A to the electronic device 200. The screen projection data A includes the screen projection image frame A, location information of a plurality of screen projection pages in the screen projection image frame A, and the dirty region range information A. After the electronic device 200 receives the screen projection data A sent by the electronic device 100, the electronic device 200 may crop out the display data (display data 801, display data 802, and display data 803 as shown in FIG. 8A) within the dirty region range in the screen projection image frame A, and render and display the display data in the corresponding screen projection window (for example, the screen projection page 484, the screen projection page 492, and the screen projection page 474 as shown in FIG. 4H).

Figure 4H:
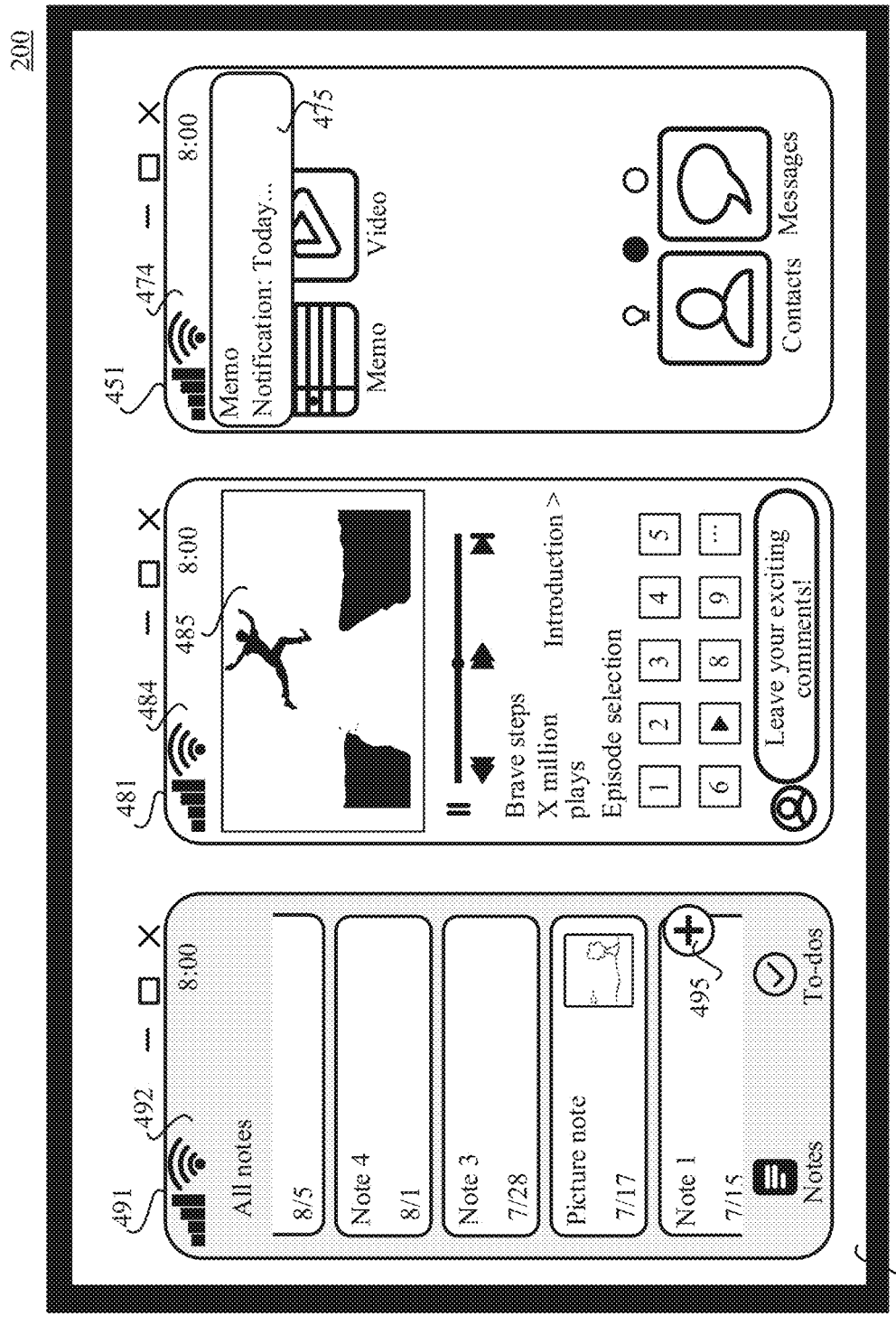

As shown in FIG. 4H, the electronic device 200 displays the user interface 400, where the user interface 400 includes the screen projection window 451, the screen projection window 481, and a screen projection window 491. The screen projection window 451 displays the screen projection page 474. Compared with the screen projection page 473, the screen projection page 474 further displays a pop-up window 475. The screen projection window 481 displays the screen projection page 484. The screen projection page 484 is a real-time surface of the Video application interface sent by the electronic device 100. The screen projection page 484 may include a play window 485, and the play window 485 is playing a video. The screen projection window 491 displays the screen projection page 492. The screen projection page 492 is a real-time surface of the Memo application interface sent by the electronic device 100. The screen projection page 492 may include a creation control 495, and the creation control 495 may be configured to create a new note.

The electronic device 200 may receive an input operation (e.g., click) of the user for the creation control 495. In response to the input, the electronic device 200 may first send input information corresponding to the input operation to the electronic device 100. In response to the input information, the electronic device 100 may synthesize the Memo application interface, the Video application interface, and the home interface into a screen projection image frame B of a frame (for example, a screen projection image frame 810 shown in FIG. 8B). The electronic device 100 may further determine a dirty region range of the screen projection image frame B, to obtain dirty region range information B. The electronic device 100 may send the screen projection data B to the electronic device 200. The screen projection data B includes the screen projection image frame B, location information of a plurality of screen projection pages in the screen projection image frame B, and the dirty region range information B. After the electronic device 200 receives the screen projection data B sent by the electronic device 100, the electronic device 200 may crop out a screen projection page that is in the dirty region range and that is in the screen projection image frame, and display in a screen projection window corresponding to the screen projection page that is in the dirty region range.

The electronic device 200 may further discard a screen projection page that is outside the dirty region range and that is in the screen projection image frame, and display a screen projection page of a previous frame in a screen projection window corresponding to the screen projection page.

Figure 4I:
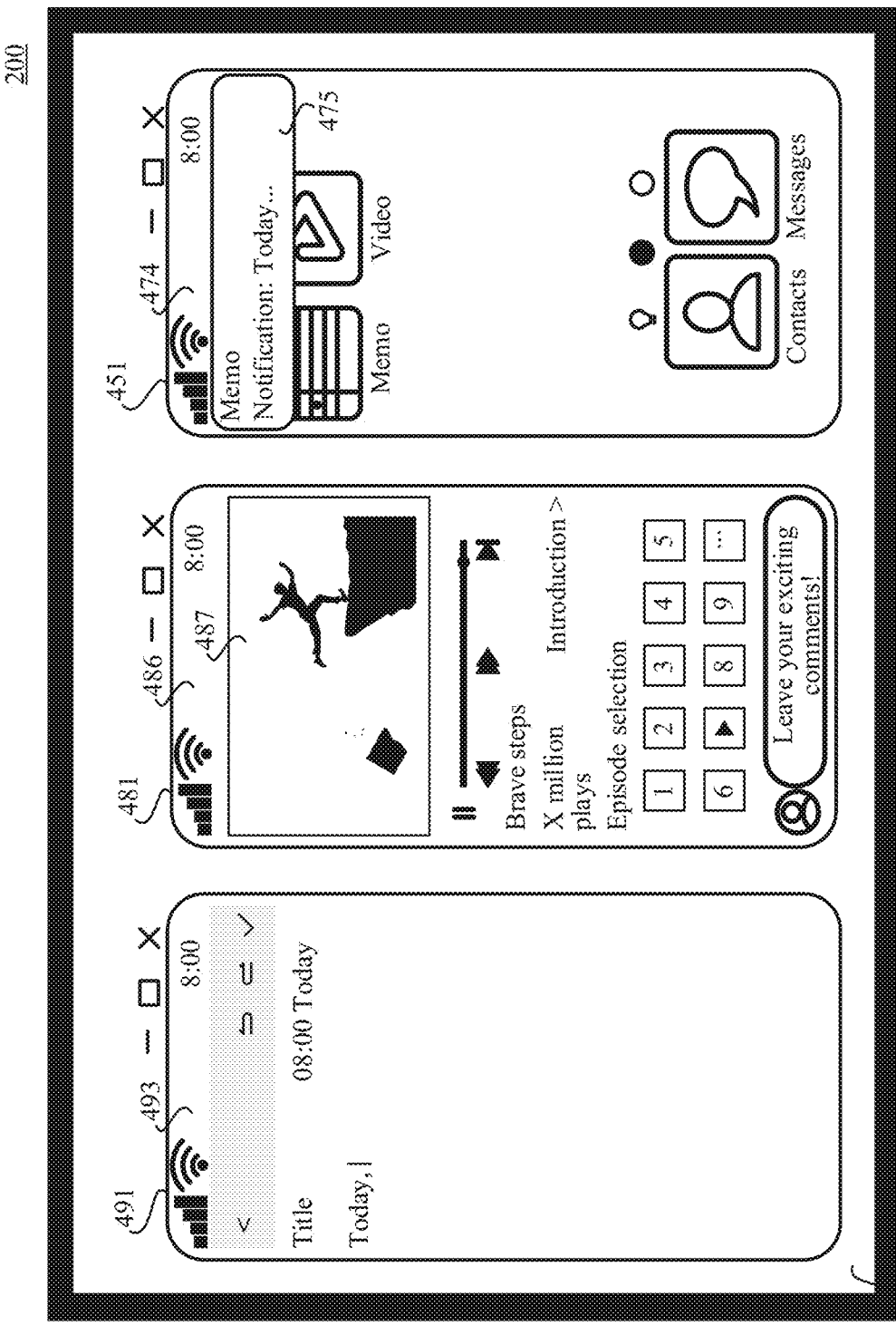

As shown in FIG. 4I, after the electronic device 200 receives the screen projection data B sent by the electronic device 100, the electronic device 200 may obtain, from the screen projection data B, the screen projection image frame B, location information of display data corresponding to the plurality of screen projection windows, and dirty region range information B. The electronic device 200 may crop out, from the screen projection image frame B based on the screen projection image frame B, the location information of the display data, and the dirty region range information B, display data 811 and display data 812 shown in FIG. 8B that are in the dirty region range. The electronic device 200 renders the display data 811 into a screen projection page 493, and displays the screen projection page 493 in the screen projection window 491. The electronic device 200 may render the display data 812 into a screen projection page 486, and display the screen projection page 486 in the screen projection window 481. Display data 813 in the screen projection image frame B does not change compared with the display data 803, and is outside the dirty region range. Therefore, the electronic device 200 may continue to display the screen projection page 474 of the previous frame in the screen projection window 451. The screen projection page 486 is a real-time surface of the Video application interface sent by the electronic device 100. The screen projection page 486 may include a play window 487, and the play window 487 is playing a video. The screen projection window 491 displays the screen projection page 493. The screen projection page 493 is a real-time surface of the Memo application interface sent by the electronic device 100. The screen projection page 493 is a note editing page.

According to the screen projection method provided in this embodiment of this application, the electronic device 100 may synthesize a new screen projection surface after a predetermined time (for example, 5 ms), and send the screen projection surface to the electronic device 200. When display content in a specified screen projection window changes (e.g., when display content in a specified screen projection window includes graphics interchange format (graphics interchange format, GIF) motion picture or a video being played, the display content in the screen projection window changes, or when some function controls of a specified screen projection window are selected by the user, the display content in the screen projection window also changes), display content in other screen projection windows remains unchanged. If the electronic device 200 renders and displays surfaces of each screen projection window regardless of whether display content in a screen projection window changes. GPU resources are wasted. Therefore, the electronic device 100 may send data such as the dirty region range and the screen projection image frame to the electronic device 200. The electronic device 200 may parse the dirty region range, and update the screen projection page of the screen projection window in the dirty region range in real time. Because the electronic device 200 updates only images in the dirty region range, GPU usage can be effectively reduced, and a probability of intermittent stop during screen projection can be reduced.

Figure 5:
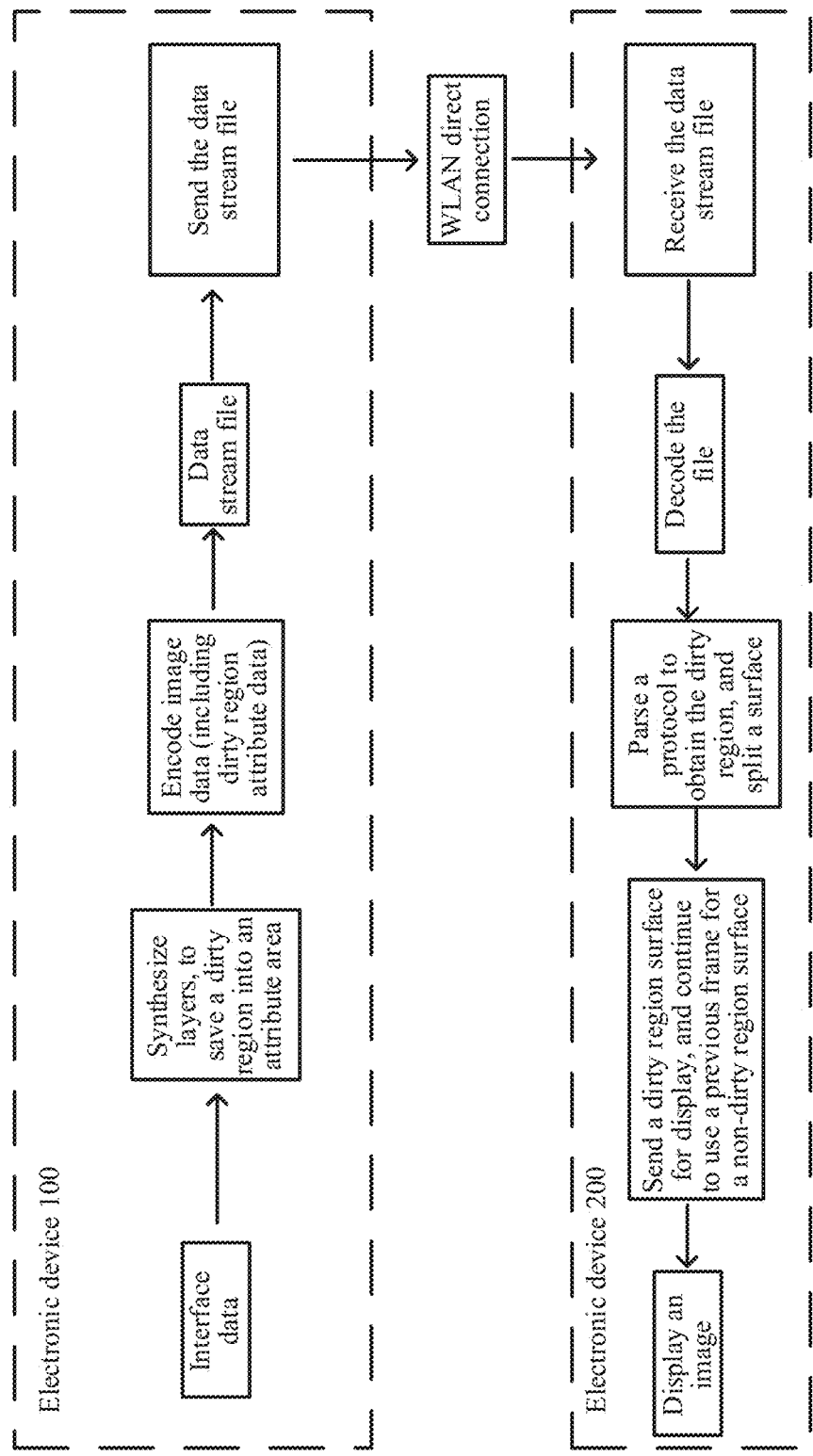
FIG. 5 is a schematic flowchart of a screen projection method according to an embodiment of this application.

FIG. 5 is a schematic flowchart of a screen projection method according to an embodiment of this application. The flowchart may be applied to the communication system 10.

As shown in FIG. 5, a screen projection method provided in this embodiment of this application may include the following steps.

1. An electronic device 100 may obtain display data of one or more screen projection windows that are projected, and write the display data into a specified storage area. For example, as shown in FIG. 4I, the electronic device 100 obtains display data (home interface data) of a screen projection window 451, display data (Video application interface data) of a screen projection window 481, and display data (Memo application interface data) of a screen projection window 491, and writes the display data of the three screen projection windows into a specified storage area of the electronic device 100.

2. The electronic device 100 may synthesize display data of one or more screen projection windows into a screen projection image frame of a frame. In this process, the electronic device 100 fetches related display data from the specified storage area. The electronic device 100 synthesizes the display data into a screen projection image frame of a frame, writes the screen projection image frame into the specified storage area, and records location information of a screen projection page corresponding to one or more screen projection windows. In addition, the electronic device 100 may obtain a dirty region range of the screen projection image frame. For example, the electronic device 100 may add a dirty region range attribute to a shared attribute area. The electronic device 100 may perform comparison between the screen projection image frame and a screen projection image frame of a previous frame when synthesizing the screen projection image frame, to obtain a region in which a surface changes. In addition, the electronic device 100 writes, into the dirty region range attribute of the shared attribute area, the obtained region in which a surface changes.

For example, after the electronic device 100 generates the screen projection image frame 800 shown in FIG. 8A, the electronic device 100 may record location information of three screen projection pages in the screen projection image frame. The electronic device 100 may record a distance between four edges of the display data 801 and a preset coordinate axis (an x-y plane coordinate axis in the screen projection image frame set by the electronic device 100). For example, the electronic device 100 may record location information of display data 801 as (20 pixels, 180 pixels, 15 pixels, 70 pixels). The four values represent a distance between a lower edge of the display data 801 and an x-axis, a distance between an upper edge of the display data 801 and the x-axis, a distance between a left edge of the display data 801 and a y-axis, and a distance between a right edge of the display data 801 and the y-axis, respectively.

Figure 6:
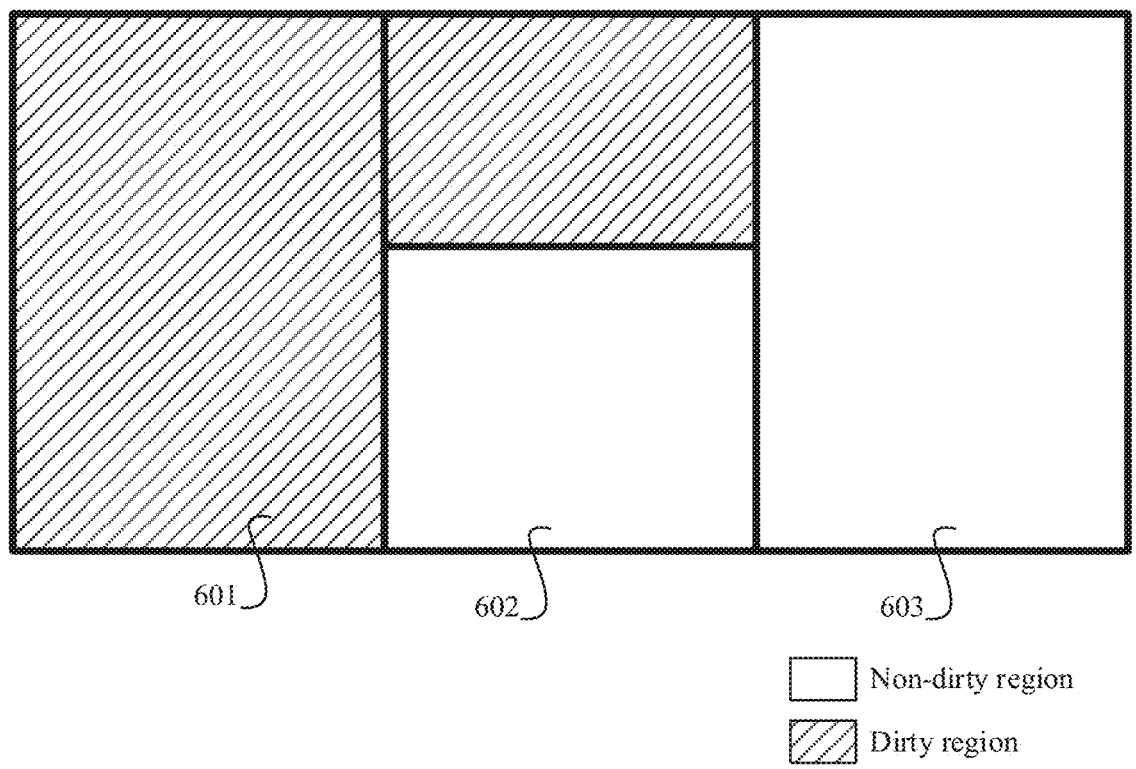
FIG. 6 is a schematic diagram of a dirty region range according to an embodiment of this application.

FIG. 6 is a schematic diagram of a dirty region range according to an embodiment of this application.

For example. FIG. 6 may show a region in which the screen projection image frame B (the screen projection image frame 810 shown in FIG. 8B) obtained by the electronic device 100 shown in FIG. 4I changes relative to the screen projection image frame A (the screen projection image frame 800 shown in FIG. 8A) obtained by the electronic device 100 shown in FIG. 4H. The display data 811 is different from the display data 801, and may be marked as a dirty region 601. Some content of the display data 812 is different from the display data 802 (content of the play window changes), and may be marked as a dirty region 602. The display data 813 is the same as the display data 803, and may not be marked as a dirty region, that is, a non-dirty region 603 shown in FIG. 6. In this embodiment of this application, when a part of a page is in the dirty region range, the page is marked as in the dirty region range. Therefore, the electronic device 100 may obtain the dirty region range information B of the screen projection image frame B, where the dirty region range information B may indicate that the display data 811 and the display data 812 are in the dirty region range, and the display data 813 is not in the dirty region range.

The following describes a process in which the electronic device 100 synthesizes a screen projection image frame.

An embodiment of this application provides a method for synthesizing a screen projection image frame. An application of the electronic device 100 may invoke a display synthesis (SurfaceFlinger) service to synthesize a surface (Surface), obtained after measurement, layout, and drawing, into a screen projection image frame of a frame. The SurfaceFlinger system service manages the display. It has the function of synthesizing Surfaces and can combine 2D surfaces and 3D surfaces of various applications.

In this embodiment of this application, the Surface may be understood as a window of an application. Each window of an application corresponds to a canvas (canvas), that is, a Surface. Every change in the application window is accompanied by an update to content of the Surface. The electronic device 100 may generate a buffer list, and the electronic device 100 may write updated display data of an application into the buffer list. Update to the content of the Surface involves generation and consumption of the buffer list.

Figure 7:
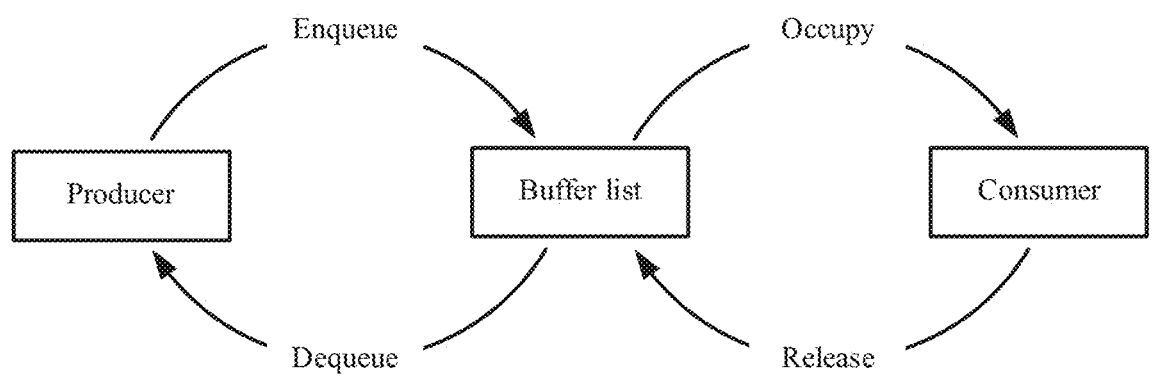
FIG. 7 is a schematic flowchart according to an embodiment of this application.

As shown in FIG. 7, in a process of processing the display data, a process of the application serves as a producer, and may generate the display data of the application. Then, the electronic device 100 may write, into a shared display memory, display content in the application. Then, the SurfaceFlinger system service, as a consumer, may fetch display data from the shared display memory, and synthesize the display data into a screen projection image frame of a frame. The production and consumption process occurs cyclically, until the producer no longer synthesizes data, and the consumer fetches all the display data in the shared display memory.

Then, the SurfaceFlinger system service of the electronic device 100 may serve as a producer. The electronic device 100 may invoke the service to write the screen projection image frame into a buffer, and the electronic device 100 may add the buffer to a buffer queue (this operation may be referred to as enqueuing). A multimedia encoder of the electronic device 100 serves as a consumer. The electronic device 100 may invoke the multimedia encoder to occupy the buffer list, and write the screen projection data into the buffer. After the multimedia encoder fetches the data in the buffer for encoding, the electronic device 100 may release the data in the buffer, and then remove the blank buffer from the buffer queue (this operation may be referred to as dequeuing). Then, the electronic device 100 may write the screen projection image frame into the blank buffer, and then add the buffer to the buffer queue. The process shown in FIG. 7 occurs alternately and cyclically, until the producer stops working and the consumer releases all buffers.

When the electronic device writes data of the screen projection image frame into the buffer queue, the electronic device 100 may compare whether display content of each application changes compared with the previous frame. (For example, the electronic device 100 may perform line-by-line pixel comparison on two pictures from top to bottom, to obtain an image change range.) The electronic device 100 may write the obtained dirty region range into the shared attribute area of the buffer list. This process can be divided into the following steps.

(1) An attribute field of the buffer list is extended, and the dirty region range (dirty_region) attribute is added. This operation may be implemented through the following code:

```
struct attr_region {
    int crc_src_rect[4];
    int write_magic:
    int write_padding;
    uint64_t crc_vals[64];
    int crop_bottom;
    int crop_left;
    int crop_top;
    int crop_right;
    int use_yuv_transform;
    int use_sparse_alloc;
    int hfbc_bufferqueue_id;
    int dirty_region[3];
}_attribute_((packed));
```

The structure of attr_region lists the attribute fields of the buffer list. To be specific, crc_src_rect and crc_vals may be used to store check codes, write_magic and write_padding may be used to set picture bezels. crop_bottom, crop_left, crop_top, and crop_right attributes may be used to mark a location of the picture. use_yuv_transform may be used to specify a mode for encoding the picture, and so on.

dirty_region is an array that may be used to mark the dirty region range. Interfaces of a plurality of applications are arranged in a horizontal direction, for example, the screen projection image frame 800 shown in FIG. 8A. Therefore, it only needs to mark whether the interface area of each application changes. If there is a change (dirty region range), it is assigned a value of 1; or if there is no change (non-dirty region range), it is assigned a value of 0.

Here, the operation of assigning a value to the dirty_region attribute may be implemented by the following program code.

```
Region dirty Region = display->getDirtyRegion(true);
Region::const_iterator begin = dirtyRegion.begin( );
Region::const_iterator end = dirtyRegion end( );
Int32_t displayEdge = mPrimaryDisplyHeight;
Void *attr_base = NULL;
activeBuffer->lockSharedAttr(&attr_base);
struct attr_region*pAttr = (struct attr_region*)attr_base;
pAttr->dirty_region[0] = 0;
pAttr->dirty_region[1] = 0;
pAttr->dirty_region[2] = 0;
while(begin != end){
    if(!begin->isEmpty( )){
        for(int i = 0; i< 3; i++){
            int32_t leftMin = displayEdge*i-100;
            int32_t leftMax = displayEdge*(i+1)+100;
            if(begin->left >= leftMin && bogin->right <= leftMax){
                pAttr->dirty_regions[i] = 1;
            }
        }
    }
}
activeBuffer->unlockSharedAttr(attr_base);
```

The above program first obtains an array of dirty region ranges and assigns it to the dirty Region attribute. Then, a constant pointer is used to point to the start and end of a data stream, to obtain a height of the screen projection image frame. After that, the dirty region range attribute dirty_region is initialized to 0. Then, the while loop is used to traverse the data stream to obtain the dirty region range (also referred to as dirty region range information).

For example, in the scenarios shown in FIG. 4H to FIG. 4I, first, the electronic device 100 generates a screen projection image frame 800 of a frame shown in FIG. 8A. The electronic device 100 first writes the Memo application interface data, the Video application interface data, and the home interface data into the specified storage area, and then invokes a related process (for example, SurfaceFlinger) to synthesize the display data of the plurality of applications into a screen projection image frame 800 of a frame. The screen projection image frame 800 includes the display data 801, the display data 802, and the display data 803. In addition, the electronic device 100 may record the location information of the foregoing three pages in the screen projection image frame. Then, the electronic device 100 may write the screen projection image frame 800 into a shared buffer, so that the multimedia encoder performs an encoding operation on the screen projection data. The electronic device 100 may send the screen projection image frame 800 to the electronic device 200 for splitting, rendering, and displaying. After that, the electronic device 100 generates a screen projection image frame 810 of a frame shown in FIG. 8B. The screen projection image frame 810 includes the display data 811, the display data 812, and the display data 813. The electronic device 100 may compare the screen projection image frame 810 with a screen projection image frame 800 of a previous frame, to obtain a region (a dirty region range) in which the screen projection image frame 810 changes relative to the screen projection image frame 800 of a previous frame. The electronic device 100 may learn that the display data 811 and the display data 812 are in the dirty region range, and the display data 813 is not in the dirty region range. Therefore, the electronic device 100 may learn that the dirty_region value of the display data 811 and the display data 812 is 1, and the dirty_region value of the display data 813 is 0. Then, the electronic device 100 may send the dirty region range information including the dirty region range attribute and the screen projection image frame 810 together to the electronic device 200. The electronic device 200 may crop out, render, and display the display data 811 and the display data 812.

3. The electronic device 100 may encode the obtained screen projection image frame through the multimedia encoder. The electronic device 100 controls the multimedia encoder to encode and decode an image by using the H.264 video encoding and decoding protocol. H.264 may also be referred to as advanced video coding (advanced video coding. MPEG-4AVC). Alternatively, the electronic device 100 may use another video encoding and decoding protocol. Optionally, the electronic device 100 may capture and compress audio that is being played by each application. A compression format of the audio may be advanced audio coding.

Figure 9:
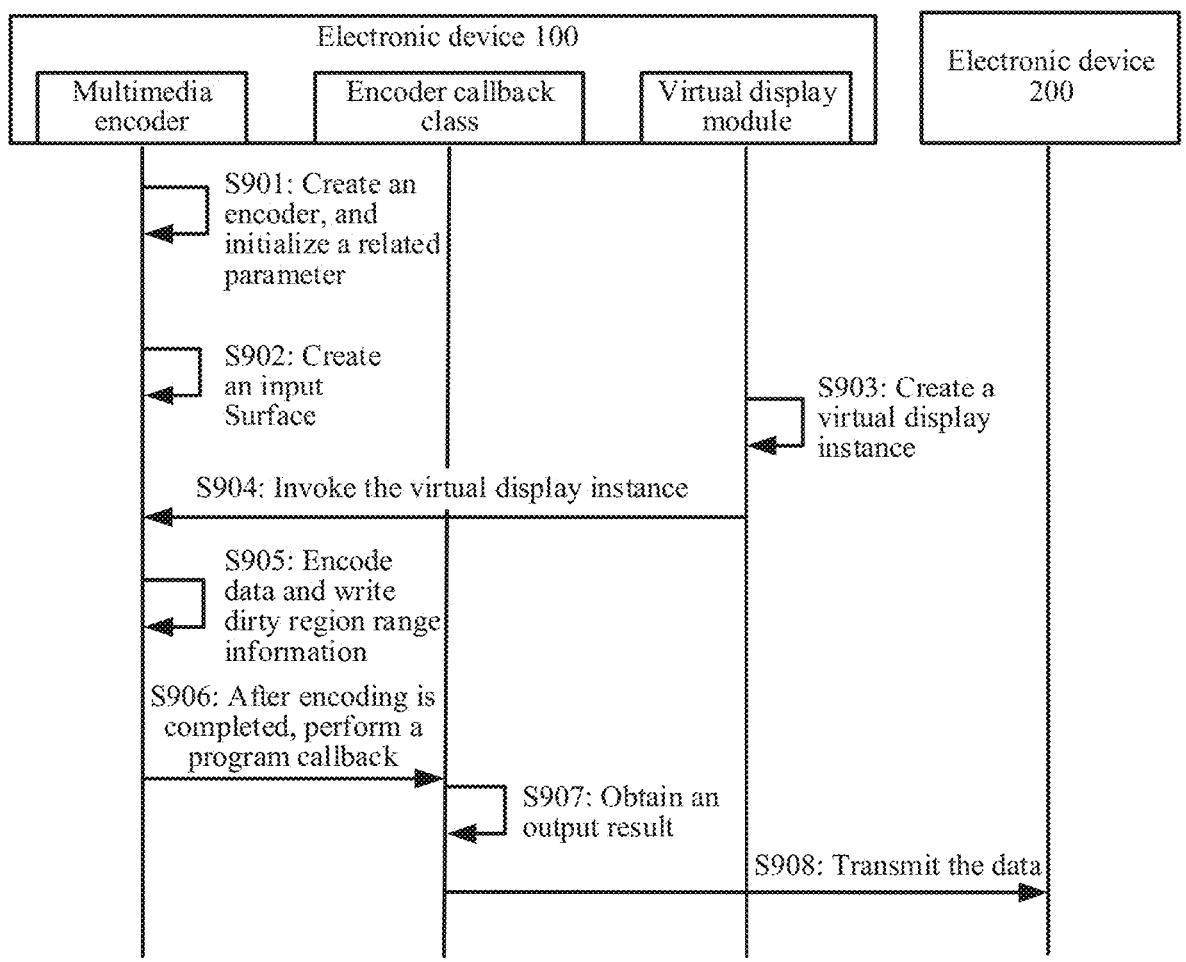
FIG. 9 is a flowchart of an image encoding module according to an embodiment of this application.

In particular, as shown in FIG. 9, FIG. 9 is a flowchart of an image encoding module according to an embodiment of this application. In particular, the steps are as follows.

S901: The multimedia encoder creates an encoder, and initializes a related parameter.

The electronic device 100 may create the encoder by using a createEncoderBy Type function. After creating the codec, the electronic device 100 may set a callback method by invoking a setCallback function interface. The electronic device 100 performs a program callback operation after the encoder completes an encoding task. Then, the electronic device 100 may configure the codec in a specified media format, and initialize the related parameter (for example, a color format). The multimedia encoder of the electronic device 100 may support encoding and decoding of a plurality of data types, for example, compressed audio and video data, original audio data, and original video data. The electronic device 100 may query results in input and output formats in a configured (Configured) state. Results of configuration may be verified through results in input and output formats before encoding and decoding.

S902: The multimedia encoder creates an input Surface instance.

After configuring an encoder (encoder), the electronic device 100 may invoke a createInputSurface function interface to create an input Surface instance. The Surface instance may be used to input a screen projection image frame of a virtual display module.

S903: The virtual display module creates a virtual display instance.

The electronic device 100 invokes a create VirtualDisplay function interface of the virtual display module to create a virtual display instance, where the virtual display instance includes an address of an available buffer configured in a system.

S904: The multimedia encoder invokes the virtual display instance of the virtual display module.

The multimedia encoder invokes the virtual display instance of the virtual display module, to obtain an address of an available buffer area. The multimedia encoder may invoke the setInputSurface method to configure a buffer address of the encoder output result for the created input Surface instance. The buffer address is the address of the available buffer area provided by the virtual display instance. The virtual display module invokes the image synthesizer module to synthesize the screen projection image frame and writes the frame into the buffer. The input Surface instance can provide data from the buffer to the encoder.

S905: The multimedia encoder starts to encode data and write the dirty region range information.

The electronic device 100 invokes a start method. The encoder may fetch data from a buffer (buffer) and encode the data. During encoding data of screen projection interface by using the H.264, the encoder fetches the dirty region range from a shared memory area of a specified buffer list, encapsulates the dirty region range based on a transmission protocol, and writes the dirty region range into a data stream file. Maintaining ownership to an input or output buffer stops the encoder when it does not need to immediately resubmit or release the buffer to the encoder. In particular, the encoder may delay generating an output buffer until the output buffer is released or resubmitted.

S906: After the multimedia encoder completes the work, a program callback is performed.

After the encoder completes encoding, the electronic device 100 performs the program callback. To be specific, the electronic device 100 may return an end-of-stream (end-of-stream) flag by using a callback method onOutputBufferAvailable, and the input Surface stops submitting data to the encoder. It may be set in the last valid output buffer or may be set by adding an empty buffer after the last valid output buffer.

S907: Obtain an output result.

The encoder encodes the screen projection data to obtain the data stream file. The data stream file includes the screen projection image frame, location information, and the dirty region range information encapsulated based on the RTSP protocol.

S908: Data transmission.

The electronic device 100 transmits the data stream file to the electronic device 200.

4. The electronic device 100 generates a data stream file based on the encoded image/audio.

The data stream file includes the screen projection image frame, the dirty region range information of the screen projection image frame, and location information of the display data corresponding to the screen projection window in the screen projection image frame.

For example, the electronic device 100 may encode the screen projection image frame 800, and then write the encoded screen projection image frame 800 into the data stream file.

5. The electronic device 100 may send the data stream file to the electronic device 200 through the WLAN direct connection by using a real time streaming protocol.

6. The electronic device 200 receives the data stream file from the electronic device 100 by using the real-time streaming protocol.

7. The electronic device 200 decodes the data stream file to obtain a screen projection image frame.

8. The electronic device 200 may parse the protocol used for screen projection, to obtain dirty region range information, and then split, based on the dirty region range information and a location and a size of each page in the screen projection image frame, images of all pages in the dirty region range.

Figure 8B:
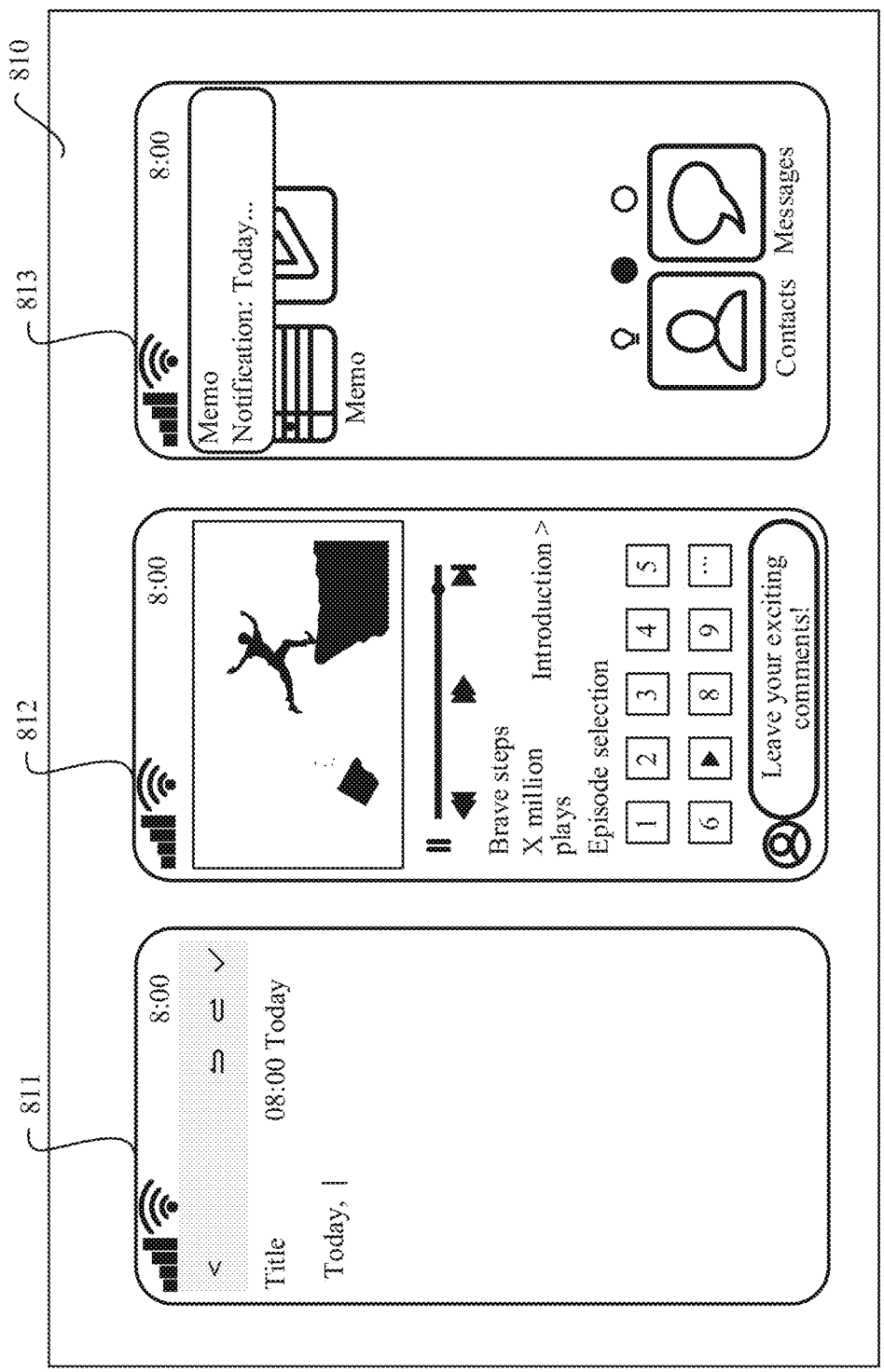

For example, the screen projection image frame is the screen projection image frame 810 shown in FIG. 8B. The electronic device 200 may obtain ranges of three screen projection pages in the screen projection image frame 810 and learn that whether the screen projection page is in the dirty region range. It can be learned from the foregoing steps that the dirty_region value of the display data 811 and the display data 812 is 1, and the dirty_region value of the display data 813 is 0. Therefore, the electronic device 200 may identify that the display data 811 and the display data 812 are in the dirty region range, and the display data 813 is in the non-dirty region range. The electronic device 200 splits images of the display data 811 and the display data 812, and writes into the specified storage area.

9. The electronic device 200 sends a split image to a graphics processing unit (graphics processing unit, GPU). The graphics processing unit renders the split image to obtain a page in the dirty region range, and sends the page to a corresponding screen projection window for display. After the electronic device 200 discards a page in the non-dirty region range, the electronic device 200 controls a screen projection window corresponding to the page to continue displaying a previous surface.

For example, as shown in FIG. 4I, the electronic device 200 displays the user interface 400, where the user interface 400 includes the screen projection window 451, the screen projection window 481, and the screen projection window 491. The screen projection window 451 displays the screen projection page 473. The screen projection window 481 displays the screen projection page 486. The screen projection window 491 displays the screen projection page 493. The pages displayed in the screen projection window 481 and the screen projection window 491 are both in the dirty region range. Therefore, the screen projection page 486 and the screen projection page 493 are rendered and displayed by the electronic device 200. The page displayed in the screen projection window 451 is not in the dirty region range. Therefore, the electronic device 200 continues to use the screen projection page 473 of a previous frame.

In this way, the electronic device 100 identifies and marks the dirty region range. Therefore, when sending the screen projection data, the electronic device 100 simultaneously sends the dirty region range attribute to the electronic device 200. The electronic device 200 may detect display data of which screen projection window does not change, and may reuse the image rendered by the GPU. In this way, the electronic device 200 can save computing time of the GPU. Intermittent stop during screen projection is avoided.

The following describes an internal implementation flowchart of a screen projection method according to an embodiment of this application.

Figure 10:
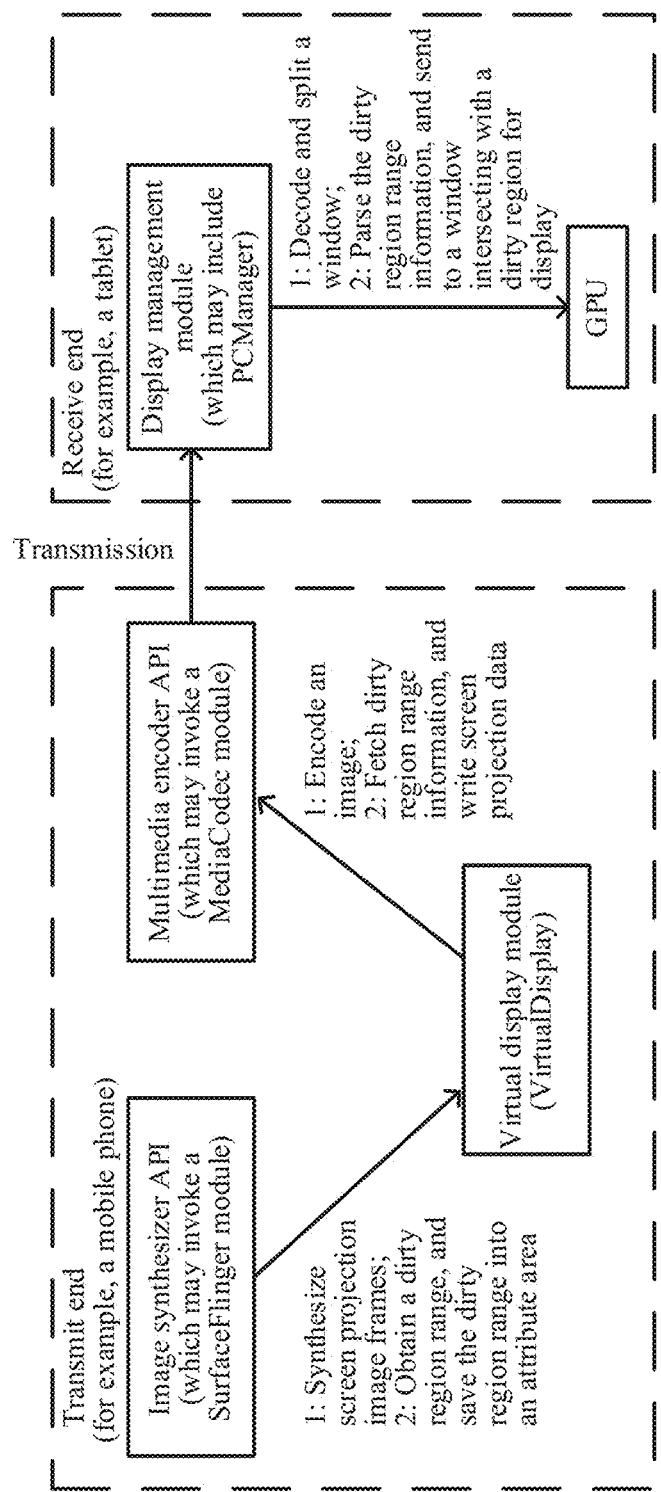
FIG. 10 is a module flowchart of a screen projection method according to an embodiment of this application.
Figure 11:
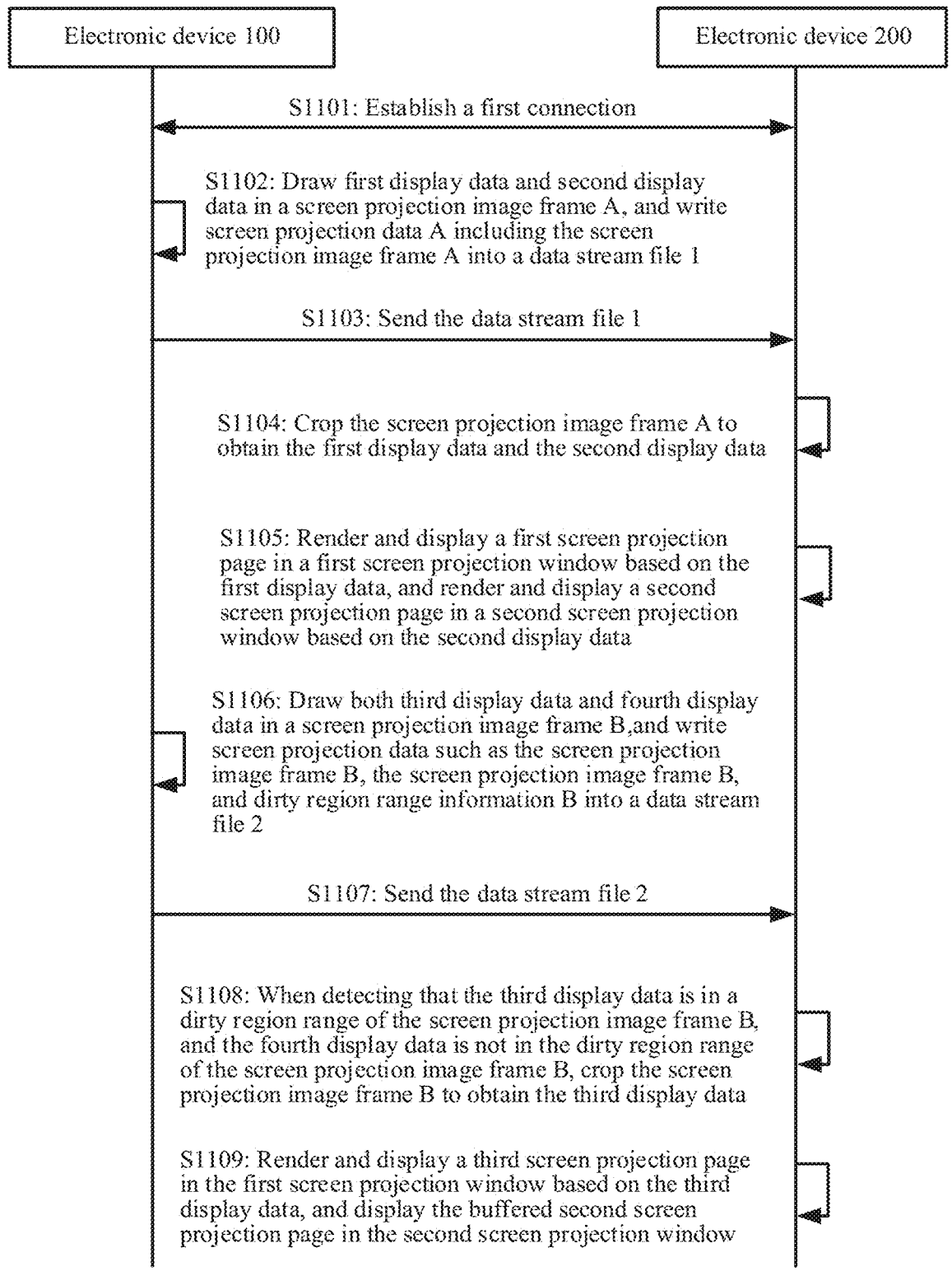
FIG. 11 is a method flowchart of a screen projection method according to an embodiment of this application.

FIG. 10 shows that a transmit end device (for example, the electronic device 100) obtains a screen projection image frame, the transmit end device transmits the screen projection image frame to a receive end device (for example, the electronic device 200), and the receive end device displays the screen projection image frame from the transmit end device. The transmit end device may be an electronic device such as a mobile phone or a tablet, and the receive end device may be an electronic device such as a tablet or a computer.

The transmit end device may include an image synthesizer API, a virtual display module, and a multimedia encoder.

The virtual display module may include a Virtual Display module. The module may provide addresses of specified storage areas for the image synthesizer API and the multimedia encoder API.

The image synthesizer module API may invoke a SurfaceFlinger module. After the SurfaceFlinger module is invoked, the image synthesizer module API may synthesize a plurality of application interfaces into a screen projection image frame of a frame. The image synthesizer module API may compare the screen projection image frame and a screen projection image frame of a previous frame, and mark the changed application interface as the dirty region range.

The multimedia encoder API may invoke the MediaCodec module. The MediaCodec module may encode the screen projection image frame to generate a data stream file, where the data stream file includes the dirty region range information. (The dirty region range information may be used to enable the electronic device 200 to identify the display data within the dirty region range.) After the encoding completed, the transmit end electronic device may send the generated transmission file to the receive end device through an RTSP protocol.

The receive end device may include a display management module. The display management module can decode the data stream file, parse the dirty region range, and send an application interface of the dirty region range to the GPU for rendering and displaying. For an application interface of a non-dirty region range, the receive end electronic device does not send the application interface to the GPU. The receive end electronic device continues to display a screen projection interface of a previous frame.

The following describes a schematic flowchart of a method according to an embodiment of this application.

FIG. 1I is a flowchart of a method in which an electronic device 100 projects a screen to an electronic device 200.

S1101: The electronic device 100 establishes a first connection to the electronic device 200.

After the electronic device 100 establishes the first connection to the electronic device 200, the electronic device 100 may transmit file data to the electronic device 200. Alternatively, the electronic device 100 may project an application interface to the electronic device 200 for display.

The first connection may be a wireless connection or a wired connection. When the first connection is the wireless connection, the first connection may be any one of a Wi-Fi direct connection, a Wi-Fi LAN connection, or a Wi-Fi softAP connection.

S1102: The electronic device 100 may draw a first display data and a second display data in a screen projection image frame A (also referred to as a first screen projection image frame). The electronic device 100 may further write screen projection data A including the screen projection image frame A into a data stream file 1.

The electronic device 100 obtains display data of a plurality of screen projection windows, and synthesizes the display data into the screen projection image frame A. The electronic device 100 encodes the screen projection image frame A by using a specified encoding and decoding protocol (for example, H.264), to obtain the data stream file 1.

In particular, the electronic device 100 may obtain the first display data (for example, the display data 801 shown in FIG. 8A) corresponding to a first screen projection window (for example, the screen projection window 481 shown in FIG. 4H), and the second display data (for example, the display data 803 shown in FIG. 8A) corresponding to a second screen projection window (for example, the screen projection window 451 shown in FIG. 4H). The electronic device 100 draws the first display data and the second display data in the screen projection image frame A (for example, the screen projection image frame 800 shown in FIG. 8A), and records location information of the first display data corresponding to the first screen projection window in the screen projection image frame A. location information of the second display data corresponding to the second screen projection window in the screen projection image frame A, and dirty region range information A. Both the first display data and the second display data are in a dirty region range.

Then, the electronic device 100 may encode the screen projection image frame A and the like, to obtain the data stream file 1.

For example, after the electronic device 100 obtains the screen projection image frame A, the electronic device 100 may compare the screen projection image frame 4 with the screen projection image frame A in FIG. 4G. The electronic device 100 may obtain the dirty region range information A in the screen projection image frame A. The electronic device 200 may learn, through the dirty region range information A, that the display data 801, the display data 802 and the display data 803 are all in the dirty region range. The electronic device 100 may write the screen projection image frame A, location information of a screen projection page in the screen projection image frame A, the dirty region range information A, and the like into the data stream file 1, and send the data stream file 1 to the electronic device 200.

S1103: The electronic device 100 sends the data stream file 1 to the electronic device 200.

The data stream file 1 may include the screen projection image frame A. location information of the display data corresponding to the plurality of screen projection windows in the screen projection image frame A, and the dirty region range information A.

S1104: The electronic device 200 crops the screen projection image frame A to obtain the first display data and the second display data.

After receiving the data stream file 1, the electronic device 200 may decode the data stream file 1, to obtain a screen projection image frame A and location information of the display data in the screen projection image frame A. In addition, it crops the screen projection image frame A to obtain the first display data and the second display data based on the location information of the display data corresponding to the plurality of screen projection windows in the screen projection image frame A, and the dirty region range information A.

S1105: The electronic device 200 may render and display the first screen projection page in the first screen projection window based on the first display data, and render and display the second screen projection page in the second screen projection window based on the second display data.

The electronic device 200 renders, through the GPU, the display data obtained through cropping, to obtain a corresponding screen projection page, and stores the screen projection page corresponding to each screen projection window into the buffer.

In particular, the electronic device 200 may generate a first screen projection page (for example, the screen projection page 492 shown in FIG. 4H) based on the first display data, and display the first screen projection page in the first screen projection window. In addition, it generates a second screen projection page (for example, the screen projection page 474 shown in FIG. 4H) based on the second display data, and displays the second screen projection page in the second screen projection window. In this case, a GPU usage may be a first threshold.

For example, after the electronic device 200 receives the screen projection data that includes the screen projection image frame A (the screen projection image frame 800 shown in FIG. 8A) and that is sent by the electronic device 100, the electronic device 200 may crop an image within the dirty region range in the screen projection image frame A (the display data 801, the display data 802, the display data 803), render and display the image, as shown in FIG. 4H. In a process of rendering the screen projection page, the electronic device 200 detects that the GPU usage is the first threshold (for example, 80%).

S1106: The electronic device 100 may draw the third display data and the fourth display data in a screen projection image frame B (also referred to as a second screen projection image frame). The electronic device 100 may further obtain location information of the display data in the screen projection image frame B, and dirty region range information B of the screen projection image frame B. In addition, it writes the screen projection data B. including the screen projection image frame B, the dirty region range information B, and the location information of the display data in the screen projection image frame B, into a data stream file 2.

The electronic device 100 obtains display data of a plurality of screen projection windows, and synthesizes the display data into the screen projection image frame B. The electronic device 100 may encode the screen projection image frame B by using a specified encoding and decoding protocol (for example, H.264), to obtain the data stream file 2.

In particular, the electronic device 100 may obtain third display data (for example, the display data 811 shown in FIG. 8B) corresponding to the first screen projection window and fourth display data (for example, the display data 813 shown in FIG. 8B) of the second screen projection window. The electronic device 100 draws the third display data and the fourth display data in the screen projection image frame B, and records location information of the third display data corresponding to the first screen projection window in the screen projection image frame B, and location information of the fourth display data corresponding to the second screen projection window in the screen projection image frame B.

In addition, the electronic device 100 may compare the screen projection image frame A with the screen projection image frame B, to obtain dirty region range information B. If the electronic device 100 detects that the third display data is different from the first display data, the electronic device 100 marks that the third display data is in the dirty region range. If the electronic device 100 detects that the fourth display data is the same as the second display data, the electronic device 100 marks that the fourth display data is not in the dirty region range. After obtaining dirty region range information B in the screen projection image frame B, the electronic device 100 may write the dirty region range information B into the data stream file 2.

For example, in the scenarios shown in FIG. 4H to FIG. 4I, then, the electronic device 100 obtains screen projection image frame B (the screen projection image frame 810 shown in FIG. 8B). The electronic device 100 compares the screen projection image frame A with the screen projection image frame B, to obtain dirty region range information B of the screen projection image frame B. To be specific, the electronic device 100 may learn that both the display data 811 and the display data 812 are in the dirty region range, and the display data 813 is not in the dirty region range. The electronic device 100 may write the screen projection image frame B, location information of a screen projection page in the screen projection image frame B, the dirty region range information B, and the like into the data stream file 2, and send the data stream file 2 to the electronic device 200.

S1107: The electronic device 100 sends the data stream file 2 to the electronic device 200.

The data stream file 2 includes the screen projection image frame B, location information of the display data corresponding to the plurality of screen projection windows in the screen projection image frame B, and the dirty region range information B.

S1108: When the electronic device 200 detects that the third display data is in a dirty region range of the screen projection image frame B, and the fourth display data is not in the dirty region range of the screen projection image frame B, the electronic device 200 crops the screen projection image frame B to obtain the third display data.

After obtaining transmission stream file 2, the electronic device 200 may decode the transmission stream file 2, to obtain a screen projection image frame B, dirty region range information B, and the like. The electronic device 200 may crop to obtain third display data of the dirty region range based on the location information of the display data corresponding to the plurality of screen projection windows in the screen projection image frame B, and the dirty region range information B.

S1109: The electronic device 200 may render and display a third screen projection page in the first screen projection window based on the third display data and display the buffered second screen projection page in the second screen projection window.

The electronic device 200 may render, through the GPU, the third display data to obtain a third screen projection page (for example, the screen projection page 493 shown in FIG. 4I) and save the third screen projection page to the buffer. Then, the electronic device 200 may display the third screen projection page in the first screen projection window. The electronic device 200 displays, in the second screen projection window, the buffered second screen projection page of a previous frame (for example, the screen projection page 474 shown in FIG. 4I). The electronic device 200 may detect, in a process in which the electronic device 200 renders the screen projection page, that the GPU usage is a second threshold.

When other conditions remain unchanged by default, the first threshold is greater than or equal to the second threshold. In this way, by using the screen projection method provided in this embodiment of this application, the GPU usage can be effectively reduced.

For example, the electronic device 200 may crop out the display data 811 in the screen projection image frame B, render the display data 811 to obtain a screen projection page 493 and display the screen projection page 493 in the screen projection window 491. In addition, the electronic device 200 may crop out the display data 812, render the display data 812 to obtain a screen projection page 486 and display the screen projection page 486 in the screen projection window 481, and continue to display the screen projection page 474 in the screen projection window 451, as shown in FIG. 4I. In a process of rendering the screen projection page, the electronic device 200 detects that the GPU usage is the first threshold (for example, 50%). In the screen projection image frame B, only the display data 811 and the display data 812 are in the dirty region range. Therefore, the electronic device 200 only needs to render the display data 811 and the display data 812, thereby effectively reducing the GPU usage.

In a possible implementation, the electronic device 100 may obtain first display data corresponding to the first screen projection window on the electronic device 200 and second display data corresponding to the second screen projection window on the electronic device 200. The electronic device 100 may send the first display data and the second display data to the electronic device 200. The electronic device 200 may render and display the first screen projection page in the first screen projection window based on the first display data and render and display the second screen projection page in the second screen projection window based on the second display data.

Then, the electronic device 100 may obtain third display data corresponding to the first screen projection window on the electronic device 200 and fourth display data corresponding to the second screen projection window on the electronic device 200. The electronic device 100 detects that the third display data is different from the first display data, and the fourth display data is the same as the second display data. The electronic device 100 may compare the third display data with the first display data to obtain a region C in which the third display data is different from the first display data, and record location information of the region C. The electronic device 100 may send the third display data, the fourth display data, and the location information of the region C to the electronic device 200.

The electronic device 200 may crop out the display data in the region C from the third display data based on the location information of the region C. The electronic device 200 may display the buffered first screen projection page in the first screen projection window, and render and display the obtained display data in the region C at the location of the region C on the first screen projection page. In addition, the electronic device 200 may display the buffered second screen projection page in the second screen projection window. In this way, the electronic device 200 can more accurately obtain a region in which the screen projection image frame of two frames changes relative to each other, thereby further reducing the GPU usage.

Optionally, the electronic device 100 may send only the third display data and the location information of the region C.

Optionally, the electronic device 100 may send only the display data in the region A.

For example, as shown in FIG. 4H to FIG. 4I, the electronic device 100 obtains a screen projection image frame 800. The electronic device 100 sends the display data of the screen projection image frame 800 to the electronic device 200. After receiving the display data of the screen projection image frame 800, the electronic device 200 may split, render, and display a display page corresponding to each screen projection window in the screen projection image frame 800. Then, the electronic device 100 obtains a screen projection image frame 810. By comparing the screen projection image frame 810 with the screen projection image frame 800, the electronic device 100 may learn that all images on the display page 811 change, and mark that an entire page range is a dirty region range. In addition, the electronic device 100) may learn that some images on the display page 812 change, and mark that a play window region of the page is a dirty region range. The electronic device 100 may record location information of the dirty region range. The location information may include a coordinate point at an upper left corner of the dirty region range, a horizontal distance of the dirty region range, and a vertical distance of the dirty region range. For example, the location information of the dirty region range of the screen projection image frame 810 may be (15, 180, 55, 160) or (80, 170, 55, 50). (15, 180, 55, 160) may indicate that the dirty region range of the display page 811 is an entire region with 55 pixels to the left starting from the coordinate point (15, 180) and 160 pixels down starting from the coordinate point (15, 180). (80, 170, 55, 50) may indicate that the dirty region range of the display page 812 is an entire region with 55 pixels to the left starting from the coordinate point (80, 170) and 50 pixels down starting from the coordinate point (80, 170). The electronic device 100 may send both the screen projection image frame 810 and the location information of the dirty region range to the electronic device 200. The electronic device 200 may fetch and render, based on the received location information of the dirty region range, image data within the dirty region range, and splice the image data into a location corresponding to a screen projection image frame of a previous frame. The electronic device 200 may then send the spliced image to the corresponding screen projection window for display.

In a possible implementation, the electronic device 100 may obtain first display data corresponding to the first screen projection window on the electronic device 200 and second display data corresponding to the second screen projection window on the electronic device 200. The electronic device 100 may send the first display data and the second display data to the electronic device 200. The electronic device 200 may render and display the first screen projection page in the first screen projection window based on the first display data and render and display the second screen projection page in the second screen projection window based on the second display data. Then, the electronic device 100 may obtain third display data corresponding to the first screen projection window on the electronic device 200 and fourth display data corresponding to the second screen projection window on the electronic device 200. The electronic device 100 detects that the third display data is different from the first display data, and the fourth display data is the same as the second display data. The electronic device 100 may send the third display data to the electronic device 200. The electronic device 200 may render and display a third screen projection page in the first screen projection window based on the third display data, and display the buffered second screen projection page in the second screen projection window.

The foregoing embodiments are merely used to describe the technical solutions of this application, but not to limit the technical solutions. Although this application is described in detail with reference to the foregoing embodiments, a person of ordinary skill in the art should understand that: The technical solutions described in the foregoing embodiments may still be modified, or some technical features thereof may be equivalently replaced. However, these modifications or replacements do not cause the essence of the corresponding technical solutions to depart from the scope of the technical solutions in embodiments of this application.

What is claimed is:

1. A system, comprising: a first electronic device and a second electronic device, wherein
    the first electronic device is configured to obtain first display data corresponding to a first screen projection window on the second electronic device and second display data corresponding to a second screen projection window on the second electronic device;
    the first electronic device is further configured to send the first display data and the second display data to the second electronic device;
    the second electronic device is configured to render and display a first screen projection page in the first screen projection window based on the first display data[,] and render and display a second screen projection page in the second screen projection window based on the second display data;
    the first electronic device is further configured to obtain third display data corresponding to the first screen projection window on the second electronic device and fourth display data corresponding to the second screen projection window on the second electronic device;
    the first electronic device is further configured to send the third display data and the fourth display data to the second electronic device; and
    the second electronic device is further configured to: in response to determining that the third display data is different from the first display data and that the fourth display data is the same as the second display data, render and display a third screen projection page in the first screen projection window based on the third display data, and display a buffered second screen projection page in the second screen projection window.

2. The system according to claim 1, wherein the sending the first display data and the second display data to the second electronic device comprises:
    drawing the first display data and the second display data in a first screen projection image frame;
    recording a region range of the first display data in the first screen projection image frame and a region range of the second display data in the first screen projection image frame; and
    sending the first screen projection image frame, the region range of the first display data in the first screen projection image frame, and the region range of the second display data in the first screen projection image frame to the second electronic device,
    and wherein the second electronic device is further configured to:
    before rendering and displaying the first screen projection page in the first screen projection window based on the first display data, and rendering and displaying the second screen projection page in the second screen projection window based on the second display data, crop out the first display data from the first screen projection image frame based on the region range of the first display data in the first screen projection image frame, and crop out the second display data from the first screen projection image frame based on the region range of the second display data in the first screen projection image frame.

3. The system according to claim 2, wherein the sending the third display data and the fourth display data to the second electronic device comprises:
    drawing the third display data and the fourth display data in a second screen projection image frame;
    recording a region range of the third display data in the second screen projection image frame and a region range of the fourth display data in the second screen projection image frame; and
    sending the second screen projection image frame, the region range of the third display data in the second screen projection image frame, and the region range of the fourth display data in the second screen projection image frame to the second electronic device,
    and wherein the second electronic device is further configured to:
    before rendering and displaying the third screen projection page in the first screen projection window based on the third display data, and displaying the buffered second screen projection page in the second screen projection window, crop out the third display data from the second screen projection image frame based on the region range of the third display data in the second screen projection image frame.

4. The system according to claim 3, wherein the first electronic device is further configured to:
    determine a dirty region range in which image content in the second screen projection image frame is different from that in the first screen projection image frame; and
    send the dirty region range to the second electronic device, and wherein the determining that the third display data is different from the first display data and the fourth display data is the same as the second display data comprises:
determining, in response to at least that the dirty region range overlaps the region range of the third display data in the second screen projection image frame but does not overlap the region range of the fourth display data in the second screen projection image frame, that the third display data is different from the first display data and that the fourth display data is the same as the second display data.

5. The system according to claim 1, wherein the second electronic device is further configured to: in response to determining that the third display data is different from the first display data and that the fourth display data is different from the second display data, render and display the third screen projection page in the first screen projection window based on the third display data, and render and display a fourth screen projection page in the second screen projection window based on the fourth display data.

6. The system according to claim 1, wherein the second electronic device is further configured to: in response to determining that the third display data is the same as the first display data and that the fourth display data is the same as the second display data, display a buffered first screen projection page in the first screen projection window, and display the buffered second screen projection page in the second screen projection window.

7. The system according to claim 1, wherein the first electronic device is further configured to:
establish a wireless fidelity (Wi-Fi) direct connection to the second electronic device before obtaining the first display data corresponding to the first screen projection window on the second electronic device and the second display data corresponding to the second screen projection window on the second electronic device;
send the first display data and the second display data to the second electronic device through the Wi-Fi direct connection; and
send the third display data and the fourth display data to the second electronic device through the Wi-Fi direct connection.

8. A method, applied to a second electronic device, and comprising:
receiving, by the second electronic device, first display data corresponding to a first screen projection window and second display data corresponding to a second screen projection window that are sent by a first electronic device;
rendering and displaying, by the second electronic device, a first screen projection page in the first screen projection window based on the first display data, and a second screen projection page in the second screen projection window based on the second display data;
receiving, by the second electronic device, third display data corresponding to the first screen projection window and fourth display data corresponding to the second screen projection window that are sent by the first electronic device; and
rendering and displaying, by the second electronic device, a third screen projection page in the first screen projection window based on the third display data, and displaying a buffered second screen projection page in the second screen projection window, in response to the second electronic device determining that the third display data is different from the first display data and the fourth display data is the same as the second display data.

9. The method according to claim 8, wherein the receiving, by the second electronic device, first display data corresponding to a first screen projection window and second display data corresponding to a second screen projection window that are sent by a first electronic device specifically comprises:
receiving, by the second electronic device, a first screen projection image frame, a region range of the first display data in the first screen projection image frame, and a region range of the second display data in the first screen projection image frame that are sent by the first electronic device, wherein the first screen projection image frame comprises the first display data and the second display data;
cropping out, by the second electronic device, the first display data from the first screen projection image frame based on the region range of the first display data in the first screen projection image frame; and
cropping out, by the second electronic device, the second display data from the first screen projection image frame based on the region range of the second display data in the first screen projection image frame.

10. The method according to claim 9, wherein the receiving, by the second electronic device, third display data and fourth display data that are sent by the first electronic device specifically comprises:
receiving, by the second electronic device, a second screen projection image frame, a region range of the third display data in the second screen projection image frame, and a region range of the fourth display data in the second screen projection image frame that are sent by the first electronic device, wherein the second screen projection image frame comprises the third display data and the fourth display data;
cropping out, by the second electronic device, the third display data from the second screen projection image frame based on the region range of the third display data in the second screen projection image frame; and
cropping out, by the second electronic device, the fourth display data from the second screen projection image frame based on the region range of the fourth display data in the second screen projection image frame.

11. The method according to claim 10, wherein the method further comprises:
receiving, by the second electronic device, a dirty region range that is sent by the first electronic device and in which image content in the second screen projection image frame is different from that in the first screen projection image frame,
and wherein the determining, by the second electronic device, that the third display data is different from the first display data and the fourth display data is the same as the second display data specifically comprises:
determining, by the second electronic device, that the third display data is different from the first display data and that the fourth display data is the same as the second display data, in response to at least that the dirty region range overlaps the region range of the third display data in the second screen projection image frame but does not overlap the region range of the fourth display data in the second screen projection image frame.

12. The method according to claim 8, wherein the method further comprises:

rendering and displaying, by the second electronic device, the third screen projection page in the first screen projection window based on the third display data, and rendering and displaying a fourth screen projection page in the second screen projection window based on the fourth display data, in response to the second electronic device determining that the third display data is different from the first display data and the fourth display data is different from the second display data.

13. The method according to claim 8, wherein the method further comprises:
displaying a buffered first screen projection page in the first screen projection window, and displaying the buffered second screen projection page in the second screen projection window, in response to the second electronic device determining that the third display data is the same as the first display data and the fourth display data is the same as the second display data.

14. The method according to claim 8, wherein before the receiving, by the second electronic device, first display data corresponding to a first screen projection window and second display data corresponding to a second screen projection window that are sent by a first electronic device, the method further comprises:
establishing, by the second electronic device, a wireless fidelity (Wi-Fi) direct connection to the first electronic device,
wherein the receiving, by the second electronic device, first display data corresponding to a first screen projection window and second display data corresponding to a second screen projection window that are sent by a first electronic device specifically comprises:
receiving, by the second electronic device through the Wi-Fi direct connection, the first display data and the second display data that are sent by the first electronic device,
and wherein the receiving, by the second electronic device, third display data corresponding to the first screen projection window and fourth display data corresponding to the second screen projection window that are sent by the first electronic device specifically comprises:
receiving, by the second electronic device through the Wi-Fi direct connection, the third display data and the fourth display data that are sent by the first electronic device.

15. An electronic device, being a second electronic device, and comprising: one or more processors, a wireless fidelity (Wi-Fi) module, and one or more memories, wherein the one or more memories and the Wi-Fi module are coupled to the one or more processors, the one or more memories store programming instructions for execution by the one or more processors to cause the second electronic device to perform operations comprising:
receiving first display data corresponding to a first screen projection window and second display data corresponding to a second screen projection window that are sent by a first electronic device;
rendering and displaying a first screen projection page in the first screen projection window based on the first display data, and a second screen projection page in the second screen projection window based on the second display data;
receiving third display data corresponding to the first screen projection window and fourth display data corresponding to the second screen projection window that are sent by the first electronic device; and
rendering and displaying a third screen projection page in the first screen projection window based on the third display data, and displaying a buffered second screen projection page in the second screen projection window, in response to the second electronic device determining that the third display data is different from the first display data and the fourth display data is the same as the second display data.

16. The electronic device according to claim 15, wherein the operations further comprise:
receiving a first screen projection image frame, a region range of the first display data in the first screen projection image frame, and a region range of the second display data in the first screen projection image frame that are sent by the first electronic device, wherein the first screen projection image frame comprises the first display data and the second display data;
cropping out the first display data from the first screen projection image frame based on the region range of the first display data in the first screen projection image frame; and
cropping out the second display data from the first screen projection image frame based on the region range of the second display data in the first screen projection image frame.

17. The electronic device according to claim 16, wherein the operations further comprise:
receiving a second screen projection image frame, a region range of the third display data in the second screen projection image frame, and a region range of the fourth display data in the second screen projection image frame that are sent by the first electronic device, wherein the second screen projection image frame comprises the third display data and the fourth display data;
cropping out the third display data from the second screen projection image frame based on the region range of the third display data in the second screen projection image frame; and
cropping out the fourth display data from the second screen projection image frame based on the region range of the fourth display data in the second screen projection image frame.

18. The electronic device according to claim 17, wherein the operations further comprise:
receiving a dirty region range that is sent by the first electronic device and in which image content in the second screen projection image frame is different from that in the first screen projection image frame; and
determining that the third display data is different from the first display data and that the fourth display data is the same as the second display data, in response to at least that the dirty region range overlaps the region range of the third display data in the second screen projection image frame but does not overlap the region range of the fourth display data in the second screen projection image frame.

19. The electronic device according to claim 15, wherein the operations further comprise:
rendering and displaying the third screen projection page in the first screen projection window based on the third display data, and render and display a fourth screen projection page in the second screen projection window based on the fourth display data, in response to the second electronic device determining that the third display data is different from the first display data and the fourth display data is different from the second display data.

20. The electronic device according to claim 15, wherein the operations further comprise:

displaying a buffered first screen projection page in the first screen projection window, and displaying the buffered second screen projection page in the second screen projection window, in response to the second electronic device determining that the third display data is the same as the first display data and the fourth display data is the same as the second display data.

* * * * *

UNITED STATES PATENT AND TRADEMARK OFFICE
CERTIFICATE OF CORRECTION

| | |
|---|---|
| PATENT NO. | : 12,079,537 B2 |
| APPLICATION NO. | : 18/552630 |
| DATED | : September 3, 2024 |
| INVENTOR(S) | : Kang Gao and Qianqiao Hu |

It is certified that error appears in the above-identified patent and that said Letters Patent is hereby corrected as shown below:

In the Claims

In Column 35, In Line 56, In Claim 1, delete "data[,]" and insert -- data --.

Signed and Sealed this
Tenth Day of December, 2024

Katherine Kelly Vidal
*Director of the United States Patent and Trademark Office*